(12) United States Patent
Aykol et al.

(10) Patent No.: US 10,374,262 B2
(45) Date of Patent: Aug. 6, 2019

(54) PROTECTIVE CATHODE COATINGS FOR LITHIUM-ION BATTERIES

(71) Applicant: Northwestern University, Evanston, IL (US)

(72) Inventors: Muratahan Aykol, Moraga, CA (US); Soo Kim, Skokie, IL (US); Shiqiang Hao, Glenview, IL (US); Zhi Lu, Evanston, IL (US); Vinay Ishwar Hegde, Chicago, IL (US); David H. Snydacker, Evanston, IL (US); Scott J. Kirklin, Evanston, IL (US); Dane Morgan, Middleton, WI (US); Christopher M. Wolverton, Evanston, IL (US)

(73) Assignee: Northwestern University, Evanston, IL (US)

( * ) Notice: Subject to any disclaimer, the term of this patent is extended or adjusted under 35 U.S.C. 154(b) by 102 days.

(21) Appl. No.: 15/427,295

(22) Filed: Feb. 8, 2017

(65) Prior Publication Data
US 2017/0229742 A1 Aug. 10, 2017

Related U.S. Application Data

(60) Provisional application No. 62/292,631, filed on Feb. 8, 2016.

(51) Int. Cl.
*H01M 10/42* (2006.01)
*H01M 10/0525* (2010.01)
*H01M 4/505* (2010.01)
*H01M 4/525* (2010.01)

(52) U.S. Cl.
CPC ....... *H01M 10/4235* (2013.01); *H01M 4/505* (2013.01); *H01M 4/525* (2013.01); *H01M 10/0525* (2013.01)

(58) Field of Classification Search
None
See application file for complete search history.

(56) References Cited

U.S. PATENT DOCUMENTS

| | | | | |
|---|---|---|---|---|
| 2002/0070374 A1* | 6/2002 | Barker | ............... | C01G 45/1242 252/500 |
| 2009/0224212 A1* | 9/2009 | Manthiram | ........... | H01M 4/505 252/503 |

(Continued)

OTHER PUBLICATIONS

Ahmed, et al., Electrode surface engineering by atomic layer deposition: A promising pathway toward better energy storage, Nano Today 11:2, Apr. 2016, pp. 250-271.

(Continued)

*Primary Examiner* — Alix E Eggerding
(74) *Attorney, Agent, or Firm* — Bell & Manninng, LLC; Michelle Manning

(57) ABSTRACT

Cathode coatings for lithium ion batteries, cathodes coated with the coatings, and lithium ion batteries incorporating the coated cathodes are provided. The coatings, which are composed of binary, ternary, and higher order metal oxides and/or metalloid oxides, can reduce the hydrofluoric acid (HF)-induced degradation of the electrolyte and/or cathodes, thereby improving the performance of lithium ion batteries, relative to lithium ion batteries that employ bare cathodes.

31 Claims, 14 Drawing Sheets

(56) References Cited

U.S. PATENT DOCUMENTS

| | | | |
|---|---|---|---|
| 2009/0286157 A1* | 11/2009 | Chen | H01M 4/0416 429/209 |
| 2012/0282521 A1* | 11/2012 | Choi | C01G 45/1228 429/211 |
| 2014/0106223 A1 | 4/2014 | Xu et al. | |
| 2015/0349339 A1 | 12/2015 | Cho et al. | |
| 2015/0357674 A1* | 12/2015 | Haga | H01M 4/0471 429/304 |
| 2016/0190585 A1 | 6/2016 | Yoon et al. | |
| 2016/0329563 A1 | 11/2016 | Oh et al. | |
| 2017/0012284 A1 | 1/2017 | Bugga et al. | |
| 2017/0155132 A1* | 6/2017 | Kong | H01M 4/366 |

OTHER PUBLICATIONS

Aykol, Muratahan, et al., High-throughput computational design of cathode coatings for Li-ion batteries, Nature Communications 7:13779, Dec. 14, 2016, pp. 1-12.

Aykol, Muratahan, et al., Supporting Information for Thermodynamic Aspects of Cathode Coatings for Lithium-Ion Batteries, Adv. Energy Mater. 4:1400690, Aug. 5, 2014.

Aykol, Muratahan, et al., Thermodynamic Aspects of Cathode Coatings for Lithium-Ion Batteries, Adv. Energy Mater. 4:1400690, Aug. 5, 2014, pp. 1-11.

Chen, Zonghai, et al., Advanced cathode materials for lithium-ion batteries, MRS Bulletin 36, Jul. 2011, pp. 498-505.

Chen, Zonghai, et al., Role of surface coating on cathode materials for lithium-ion batteries, J. Mater. Chem. 20, Apr. 20, 2010, pp. 7606-7612.

Cho, Jaephil, et al., Comparison of Al2O3- and AlPO4-coated LiCoO2 cathode materials for a Li-ion cell, Journal of Power Sources 146, Apr. 26, 2005, pp. 58-64.

Jung, Yoon Seok, Enhanced Stability of LiCoO2 Cathodes in Lithium-Ion Batteries Using Surface Modification by Atomic Layer Deposition, Journal of the Electrochemical Society 157(1), Nov. 18, 2009, pp. A75-A81.

Kim, Yong Jeong, et al., Suppression of Cobalt Dissolution from the LiCoO2 Cathodes with Various Metal-Oxide Coatings, Journal of the Electrochemical Society 150, Nov. 5, 2003, pp. A1723-A1725.

Kirklin, Scott, et al., The Open Quantum Materials Database (OQMD): assessing the accuracy of DFT formation energies, npj Computational Materials 1:15010, Dec. 11, 2015, pp. 1-15.

Li, C., et al., Cathode materials modified by surface coating for lithium ion batteries, Electrochimica Acta 51, Dec. 13, 2005, pp. 3872-3883.

Myung, Seung-Taek, et al., Functionality of Oxide Coating for Li[Li0.05Ni0.4Co0.15Mn0.4]O2 as Positive Electrode Materials for Lithium-Ion Secondary Batteries, J. Phys. Chem. C 111, Jan. 9, 2007, pp. 4061-4067.

Park, Joong Sun, Ultrathin Lithium-Ion Conducting Coatings for Increased Interfacial Stability in High Voltage Lithium-Ion Batteries, Chem. Mater. 26, Apr. 25, 2014, pp. 3128-3134.

Saal, James E., Materials Design and Discovery with High-Throughput Density Functional Theory: The Open Quantum Materials Database (OQMD), JOM 65:11, Sep. 28, 2013, pp. 1501-1509.

Seu, Candace S., et al., Aluminum Borate Coating on High-Voltage Cathodes for Li-Ion Batteries, Journal of the Electrochemical Society 162(12), Aug. 28, 2015, pp. A2259-A2265.

Wang, Zhaoxiang, et al., Structural and electrochemical characterizations of surface-modified LiCoO2 cathode materials for Li-ion batteries, Solid State Ionics 148, Jun. 2002, pp. 335-342.

Wolverton, C., High-Throughput DFT Thermochemistry Applied to the Design of Cathode Coatings for Lithium-Ion Batteries, Conference Abstract, 229th ECS Meeting 432, Jun. 1, 2016.

Wu, H.M., et al., Surface modification of LiNi0.5Mn1.5O4 by ZrP2O7 and ZrO2 for lithium-ion batteries, Journal of Power Sources 195:9, May 1, 2010, pp. 2909-2913.

Zhao, Jianqing, et al., Surface modifications of Li-ion battery electrodes with various ultrathin amphoteric oxide coatings for enhanced cycleability, J. Solid State Electrochem. 17, Dec. 11, 2012, pp. 1049-1058.

* cited by examiner

FIG. 1A
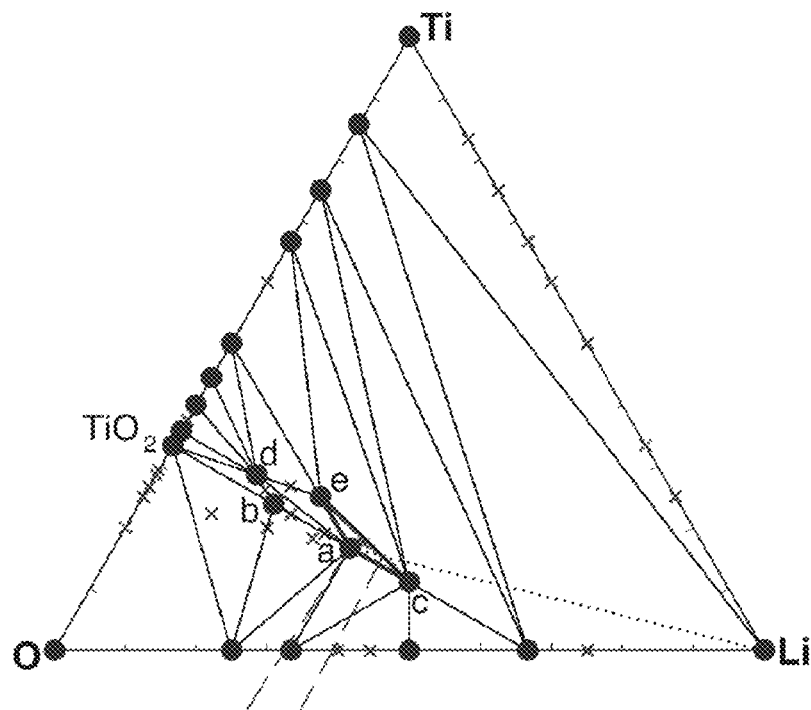
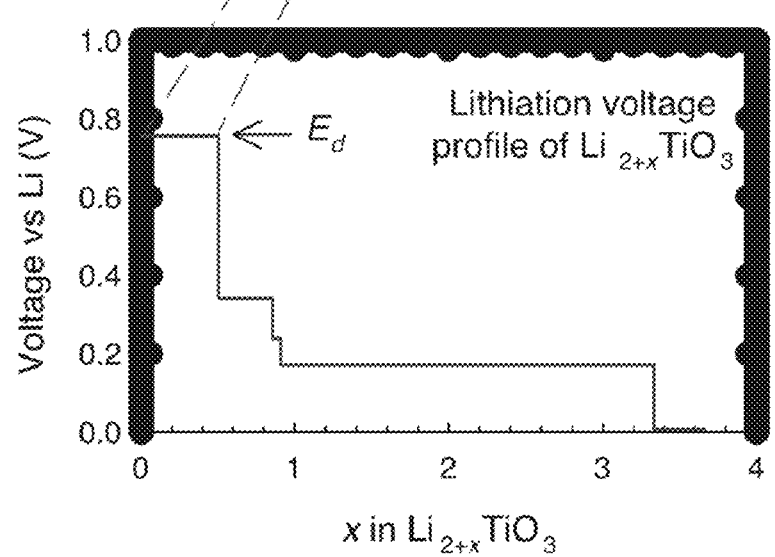
FIG. 1B

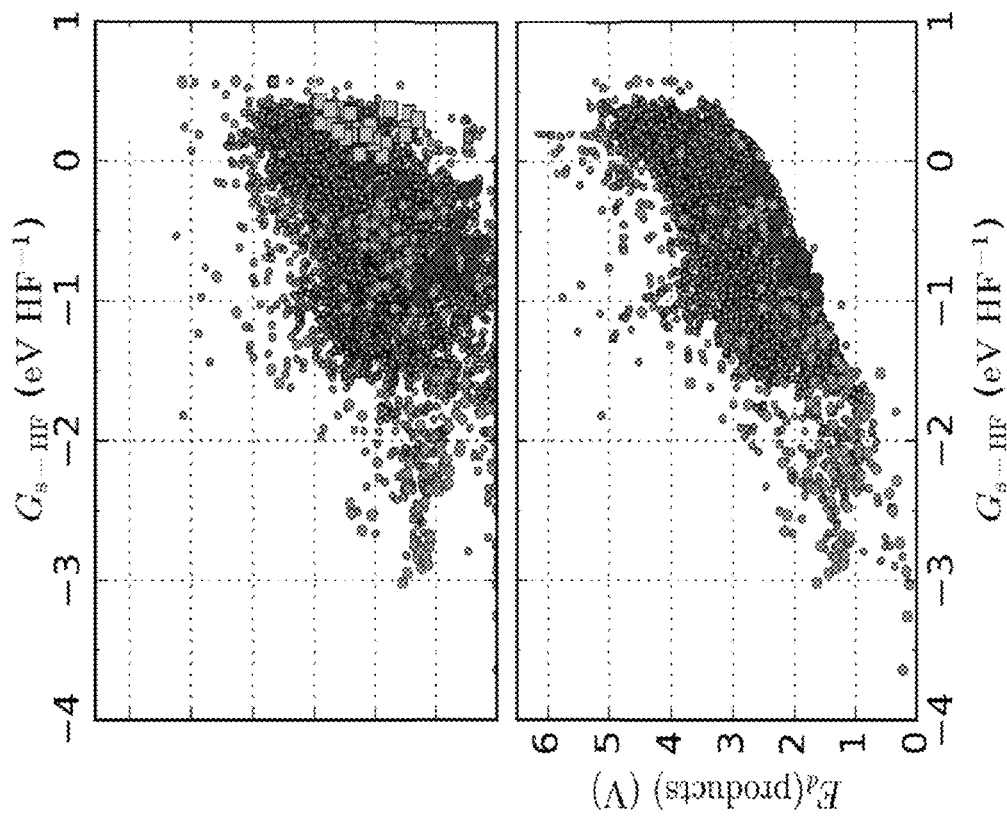

FIG. 6A: Table of 100 Cathode Coating Materials (numbers 1-38)

| Rank | Physical Barrier Coatings | HF-Barrier Coatings | HF-Scavenger Coatings |
| --- | --- | --- | --- |
| 1 | TaBO4 | WO3 | Sc2O3 |
| 2 | TaPO5 | WCl2O2 | MgO |
| 3 | HfO2 | NbPO5 | TaBO4 |
| 4 | Ta2O5 | ReO3 | Ca5B3O9F |
| 5 | WO3 | ZrP2O7 | HfO2 |
| 6 | ZrO2 | RePO5 | TaPO5 |
| 7 | HfSiO4 | NbBO4 | Sr2Ta2O7 |
| 8 | WCl2O2 | Hf2P2O9 | Mg3B2O6 |
| 9 | Sc2O3 | BaSO4 | Sr2MgB2O6 |
| 10 | BeO | GeP2O7 | Ca2Ta2O7 |
| 11 | NbPO5 | WBr4O | Ca2TaAlO6 |
| 12 | ZrSiO4 | CaSn4P6O24 | Ta2O5 |
| 13 | ZrP2O7 | Nb2O5 | ScOF |
| 14 | ScOF | MoCl4O | Li2CaGeO4 |
| 15 | NbBO4 | SrSO4 | Li2MgSiO4 |
| 16 | Hf2P2O9 | Cr2O3 | Ca2BClO3 |
| 17 | CaTi4P6O24 | SnO2 | ZrO2 |
| 18 | MgO | MoPO5 | Ca2MgWO6 |
| 19 | Ta9VO25 | MoBr2O2 | CaMgSiO4 |
| 20 | ReO3 | InP3O9 | MgAl2O4 |
| 21 | RePO5 | GeO2 | Sr2SiCl2O3 |
| 22 | ScTaO4 | CsReO4 | CaAlBO4 |
| 23 | Sr3P2O8 | NbCl3O | MgScBO4 |
| 24 | Nb2O5 | RbReO4 | CaTiO3 |
| 25 | LiAl5O8 | NaSn2P3O12 | Li2SiO3 |
| 26 | CaSn4P6O24 | BiPO4 | CaMgSi2O6 |
| 27 | ScPO4 | Sb2PbO6 | Li3NbO4 |
| 28 | ScBrO | Mn2PO4F | BaBe2B2O6 |
| 29 | Ba3P2O8 | SnSe2O6 | LiBO2 |
| 30 | GeP2O7 | VSbO4 | Ba2TiSi2O8 |
| 31 | ZrB2O5 | CrClO | BeO |
| 32 | Sc2Si2O7 | RuO2 | Li2BeSiO4 |
| 33 | BaAl2Si2O8 | CrBO3 | Mg2SiO4 |
| 34 | Li2BeSiO4 | CaSO4 | Li2TiO3 |
| 35 | Li2MgSiO4 | MnCr2O4 | Sr2Nb2O7 |
| 36 | MgAl2O4 | KReO4 | HfSiO4 |
| 37 | ScBO3 | CrP3O9 | SrTiO3 |
| 38 | HfB2O5 | MnRe2O8 | LiScSiO4 |

FIG. 6B: Table of 100 Cathode Coating Materials, Cont. (numbers 39-77)

| Rank | Physical Barrier Coatings | HF-Barrier Coatings | HF-Scavenger Coatings |
|---|---|---|---|
| 40 | Zr2P2O9 | SrSnP2O8 | MgAlBO4 |
| 41 | BaBe2B2O6 | BaHfP2O8 | SrB2O4 |
| 42 | NaTi2P3O12 | TiP2PbO8 | CaZrSi2O7 |
| 43 | Sr2Ta2O7 | BeP2O6 | CaSiO3 |
| 44 | BiPO4 | MnSO4 | Sc2Si2O7 |
| 45 | BaSO4 | LiSn2P3O12 | Ca3P2O8 |
| 46 | KTi2P3O12 | CrPO4 | CaHClO |
| 47 | SrTi4P6O24 | CoSb2O6 | ScBO3 |
| 48 | Ti4P6PbO24 | Pb2SO4F2 | Li3ScB2O6 |
| 49 | Ta2Mo2O11 | BaSnP2O8 | CaTa2O6 |
| 50 | WBr4O | SrSb2O6 | SrAl4O7 |
| 51 | SrAl2Si2O8 | PWO5 | KBe2B3O7 |
| 52 | SnO2 | Be2BO3F | LiAl5O8 |
| 53 | Cr2O3 | MnWO4 | Ca2NbAlO6 |
| 54 | HfGeO4 | TeSeO4 | Mg4Ta2O9 |
| 55 | Ba2CaB6O12 | Re2PbO8 | BaCa2Si3O9 |
| 56 | SrSO4 | CoRe2O8 | CaTaAlO5 |
| 57 | Ca3B2O6 | NiO | MgCr2O4 |
| 58 | TiO2 | BaSb2O6 | LiGaO2 |
| 59 | BiBrO | VO2 | Ba2LiB5O10 |
| 60 | TaAlO4 | SnP2Cl8O3 | BaAl2Si2O8 |
| 61 | ZrGeO4 | RbLiSO4 | Li3AlB2O6 |
| 62 | Li3PO4 | MnCO3 | CaAl4O7 |
| 63 | RbTi2P3O12 | CrBrO | Mg2TiO4 |
| 64 | BeAl2O4 | NiSb2O6 | Pb3Cl2O2 |
| 65 | BaMoO4 | Cr2CoO4 | Sr2MgSi2O7 |
| 66 | AlPO4 | InPO4 | Ba2MgSi2O7 |
| 67 | CrBO3 | Rb2Nb3Cl7O5 | Mg4Nb2O9 |
| 68 | Ca2BClO3 | MnMoO4 | Mg2B2O5 |
| 69 | NbCl3O | Nb2Te3O11 | Na2CO3 |
| 70 | ScNbO4 | VBO3 | BaSi2O5 |
| 71 | Mg3B2O6 | BiSeClO3 | ZrSiO4 |
| 72 | GeO2 | NbBr3O | Ba3P2O8 |
| 73 | Al5BO9 | InClO | CaB2O4 |
| 74 | SrMoO4 | BaP2O6 | CaBiClO2 |
| 75 | Ba2LiB5O10 | FeSb2O6 | LiAlSiO4 |
| 76 | KBe2B3O7 | Li2SO4 | CaAl2Si2O8 |
| 77 | CsTi3P5O19 | CaBePO4F | Mg2Al4Si5O18 |

FIG. 6C: Table of 100 Cathode Coating Materials, Cont. (numbers 78-100)

| Rank | Physical Barrier Coatings | HF-Barrier Coatings | HF-Scavenger Coatings |
|---|---|---|---|
| 78 | BiClO | CaSb2O6 | Mg3BO3F3 |
| 79 | InP3O9 | WI3O | ScTaO4 |
| 80 | Bi3SbO7 | NaReO4 | Sr3P2O8 |
| 81 | TiP2PbO8 | Re2NiO8 | MgH2O2 |
| 82 | Mg3BO3F3 | Tl2SO4 | SrLi2Ta2O7 |
| 83 | Sr2MgSi2O7 | Mn2PClO4 | Ca3TaGa3Si2O14 |
| 84 | LiTi2P3O12 | RePbClO4 | Li2B4O7 |
| 85 | Al2SiO5 | Co3O4 | Ba3NbGa3Si2O14 |
| 86 | Ba3V2O8 | PbSO4 | SrTa2O6 |
| 87 | SrWO4 | Co3P2O8 | Sr3TaGa3Si2O14 |
| 88 | NbInO4 | V2P4PbO14 | Ba2CaB6O12 |
| 89 | NaSn2P3O12 | MnH4Cl2O2 | CaSnO3 |
| 90 | TaBiO4 | MnH4Br2O2 | Bi3BrO4 |
| 91 | MoPO5 | KLiSO4 | KNaMg2Si4O10F2 |
| 92 | Mg2B2O5 | ZnCr2O4 | Bi3ClO4 |
| 93 | Li2TiO3 | PdO | Li4SeO5 |
| 94 | Ca2Ta2O7 | GeTe2O6 | ScNbO4 |
| 95 | CaZrSi2O7 | LiReO4 | Sr2MgReO6 |
| 96 | VSbO4 | CoSO4 | ScBrO |
| 97 | CsB3O5 | MnVH4O2F5 | Sr2TaFeO6 |
| 98 | CaMgSiO4 | KZr2P3O12 | Sr2NbFeO6 |
| 99 | SnSe2O6 | Cs2Nb3Cl7O5 | BeAl2O4 |
| 100 | Ba2MgSi2O7 | RhO2 | Bi5IO7 |

PROTECTIVE CATHODE COATINGS FOR LITHIUM-ION BATTERIES

CROSS-REFERENCE TO RELATED APPLICATIONS

The present application claims priority to U.S. provisional patent application No. 62/292,631 that was filed Feb. 8, 2016, the entire contents of which are hereby incorporated by reference.

REFERENCE TO GOVERNMENT RIGHTS

This invention was made with government support under DE-AC02-06CH11357 awarded by the U.S. Department of Energy (subcontract 4F-32002-M0001 to Northwestern University) and DMR-1309957 awarded by the National Science Foundation. The government has certain rights in the invention.

BACKGROUND

Cathode degradation is one of the most important factors that limit the lifetime of lithium (Li)-ion batteries. Major intrinsic causes of this degradation include instability against irreversible phase transformations, e.g., layered to spinel transformation in $Li_xMO_2$ type cathodes, and dissolution of the redox-active transition metal (TM) ions into the electrolyte. Corrosive species are known to attack the cathode particles and accelerate TM dissolution, which often leads to a significant capacity loss upon cycling. Hydrofluoric acid (HF), for example, forms in the presence of only trace amount of water in the common $LiPF_6$ based electrolytes. A strong correlation has been observed between HF content in the electrolyte and TM loss for common battery cathode materials including the layered $LiCoO_2$, spinel $LiMn_2O_4$ and similar cathodes. For $LiMn_2O_4$, in particular, disproportionation of surface $Mn^{3+}$ to $Mn^{2+}$ and $Mn^{4+}$, and subsequent dissolution of $Mn^{2+}$ into the electrolyte is triggered by the $H^+$ ion (i.e., acidic environments), and is a primary reason for capacity fade in this material. This dissolved Mn deposits at the anode surface and further contributes to degradation.

While alternative strategies such as doping, tailoring the particle morphology or core-shell structures have been suggested, a common approach to suppressing cathode degradation has been applying protective coatings on cathode particles. Stable binary oxides, such as $Al_2O_3$, MgO, ZnO, $ZrO_2$, $SiO_2$ and $TiO_2$ may reduce the HF-content in the electrolyte, but they do not perform equally well in suppressing the TM-loss from the cathode or the capacity fade. However, the complex nature of reactions between the cathode, coating and electrolyte prohibited the design of generic guidelines to find effective coatings beyond such simple binary oxides. A density functional theory (DFT) based materials design approach considering the thermodynamic aspects of binary metal oxide cathode coatings has been introduced. (See, Aykol, M.; Kirklin, S.; Wolverton, C. Advanced Energy Materials 2014, 4, 1400690.) This reproduced the known effective coatings, such as $Al_2O_3$, and predicted trivalent transition metal oxides as a promising class of under-explored cathode coatings. This framework was limited to only binary metal oxides, because the description of HF-reactivity and electrochemical stability of coatings were described by hypothesized reactions based on "chemical intuition" (i.e., reactions that had predefined forms, such as $M_xO_{1/2}+HF \rightarrow M_xF\frac{1}{2}H_2O$ for HF-reactivity of a metal oxide $M_xO_{1/2}$) and could not be extended to other more complex materials.

SUMMARY

Coated cathodes for lithium ion batteries and lithium ion batteries incorporating the coated cathodes are provided.

Some embodiments of the coated cathodes include: an active cathode material for a lithium ion battery; and a coating on at least a portion of the active cathode material, wherein the coating includes a borate selected from $TaBO_4$, $NbBO_4$, $Ca_5(BO_3)_3F$, $Mg_3(BO_3)_2$, $CaAlBO_4$, and $LiBO_2$.

Some embodiments of the coated cathodes include: an active cathode material for a lithium ion battery; and a coating on at least a portion of the active cathode material, wherein the coating includes a phosphate selected from $Mn_2PO_4F$ and $CaSn_4(PO_4)_6$.

Some embodiments of the coated cathodes include: an active cathode material for a lithium ion battery; and a coating on at least a portion of the active cathode material, wherein the coating includes a silicate selected from $Li_2MgSiO_4$, $CaMgSiO_4$, $CaMgSi_2O_6$, and $Li_2SiO_3$.

Some embodiments of the coated cathodes include: an active cathode material for a lithium ion battery; and a coating on at least a portion of the active cathode material, wherein the coating includes a metal oxide selected from $WO_3$, $LiAl_5O_8$, $Li_3NbO_4$, and $BaSO_4$.

Some embodiments of the coated cathodes include: a cathode comprising $LiCoO_2$; and a coating on at least a portion of the active cathode material, wherein the coating includes a metal oxide selected from $Li_2CaSiO_4$, $CaIn_2O_4$, $Li_4H_3BrO_3$, and $Li_4H_3ClO_3$.

Some embodiments of the coated cathodes include: a cathode comprising $LiMn_2O_4$; and a coating on at least a portion of the active cathode material, wherein the coating includes a metal oxide selected from $Li_2TiSiO_5$, $Ca_2Mn_3O_8$, $Li_2MnO_3$, $Ba_2TiSi_2O_8$, and $Ba_2Ti_4Fe_2O_{14}$.

Embodiments of the lithium ion batteries include: an anode; a coated cathode of the types described herein in electrical communication with the anode; an electrolyte disposed between the anode and the coated cathode; and a separator disposed between the anode and the cathode.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings.

FIG. 1A: Ternary Li—Ti—O phase diagram obtained from Open Quantum Materials Database (OQMD), where the stable and unstable phases are shown as circles and crosses, respectively. The $O_2$ chemical potential corresponds to T=298 K and p=1 atm, as explained in the Example. Dotted-line shows the lithiation path of $Li_2TiO_3$, and the first phase region along this path is highlighted with bold tie-lines. FIG. 1B: The corresponding voltage profile of $Li_{(2+x)}TiO_3$ as a function of x along the path, where the arrow points at the highest voltage step; i.e., the discharge potential criterion ($E_d$) of this coating candidate as used in the framework.

FIG. 3E: Matrix plot of $E_d$ vs. $G_{s\text{-}HF}$, employed within the coating design framework for pair-wise comparison of attributes. FIG. 3F: Matrix plot of $E_d$(products) vs. $G_{s\text{-}HF}$, employed within the coating design framework for pair-wise comparison of attributes. Based on the ideal trends of attributes for different types of coatings listed in Table 1, materials on the Pareto-front for each coating type were determined. The top 30 coating materials found by the weighted-sum method are also shown for each coating category.

FIG. 6A. Table of 100 cathode coating materials—numbers 1-38; FIG. 6B. Table of 100 cathode coating materials—numbers 39-77; and FIG. 6C. Table of 100 cathode coating materials—numbers 78-100.

DETAILED DESCRIPTION

Figure 2:
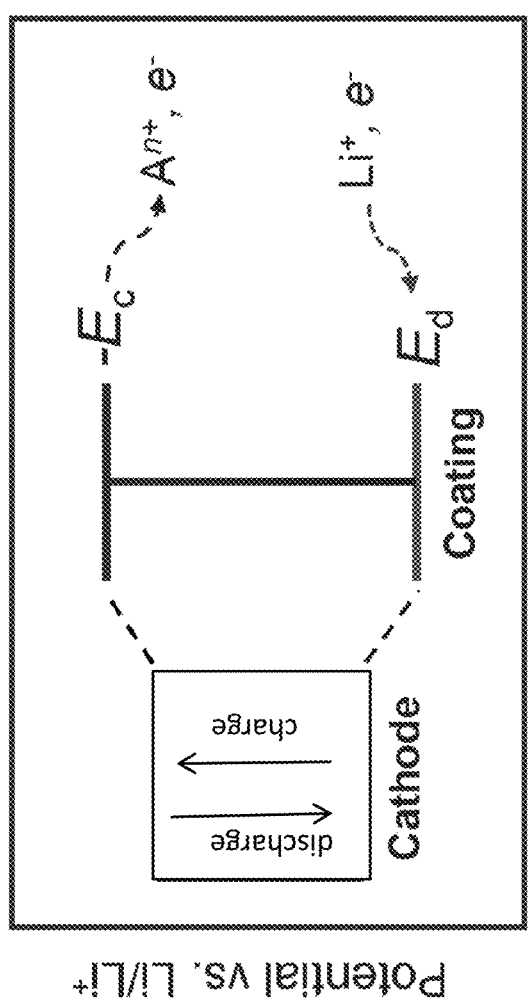
FIG. 2: Schematic comparison of the operating voltage window of a cathode to charge and discharge potentials (i.e., $E_c$ and $E_d$, respectively) of an electrochemically stable coating.
Figures 3A, 3B:
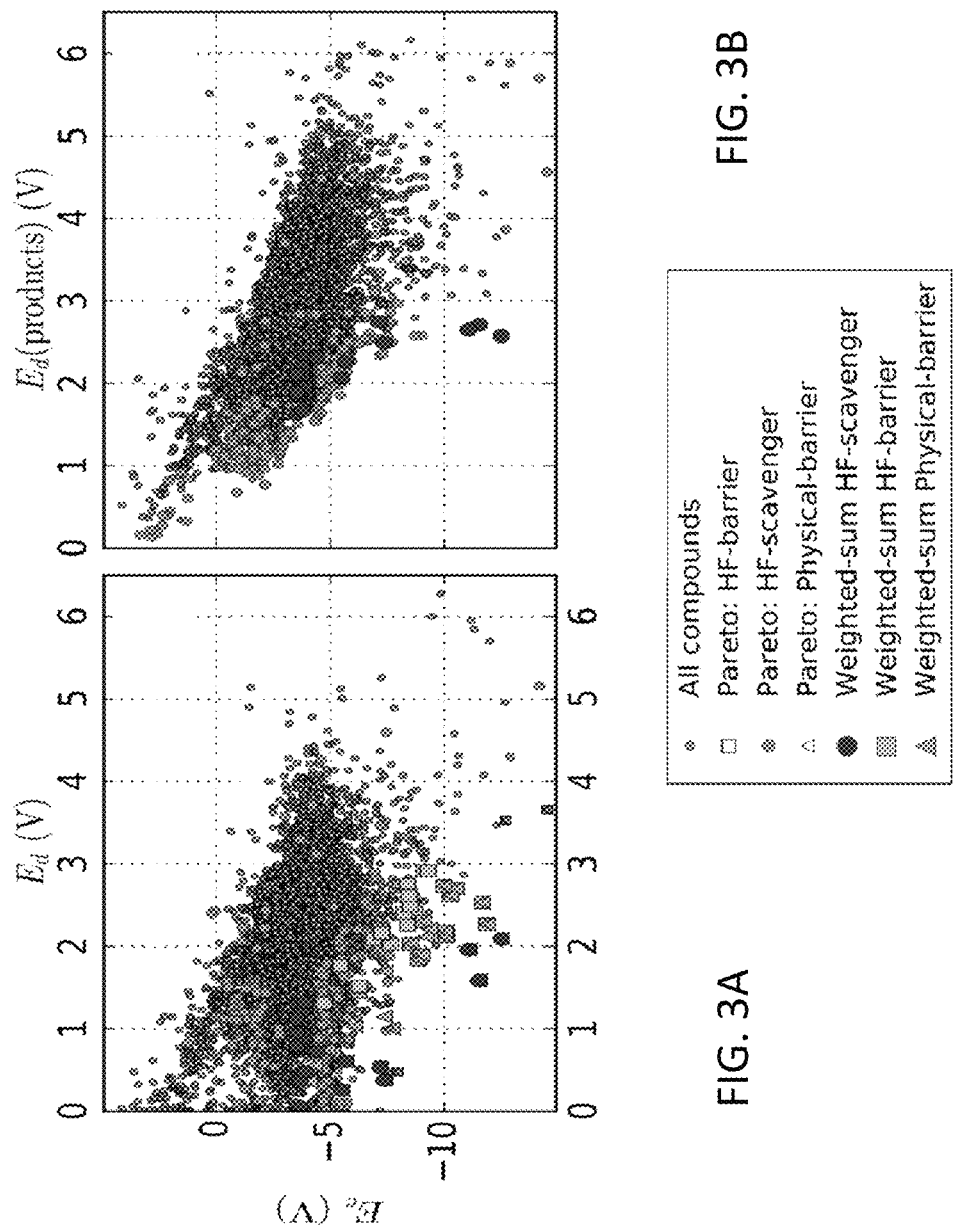
FIG. 3A: Matrix plot of $E_c$ vs. $E_d$, employed within the coating design framework for pair-wise comparison of attributes.
FIG. 3B: Matrix plot of $E_c$ vs. $E_d$(products), employed within the coating design framework for pair-wise comparison of attributes.
Figures 3C, 3D:
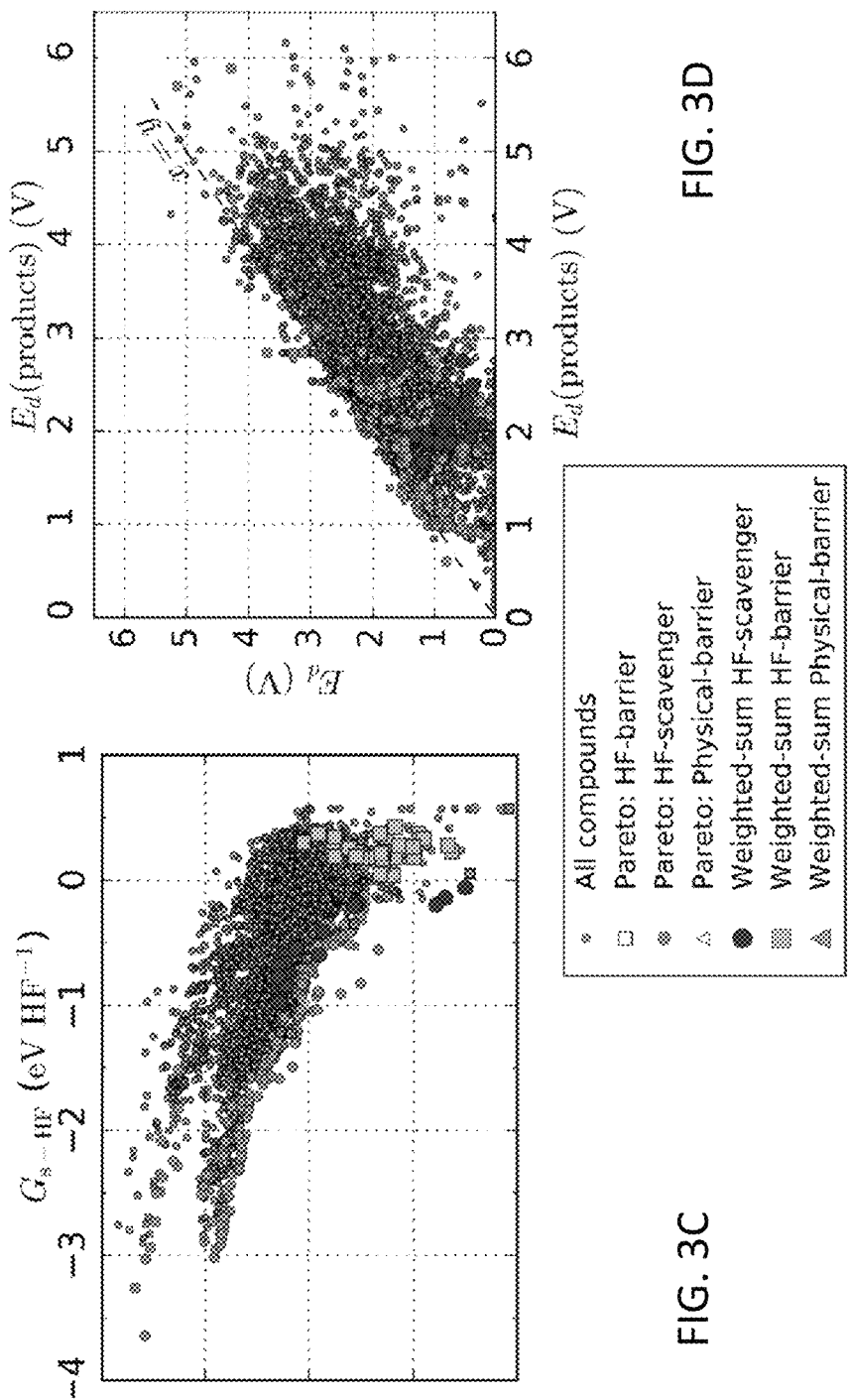
FIG. 3C: Matrix plot of $E_c$ vs. $G_{s\text{-}HF}$, employed within the coating design framework for pair-wise comparison of attributes.
FIG. 3D: Matrix plot of $E_d$ vs. $E_d$(products), employed within the coating design framework for pair-wise comparison of attributes.

Cathode coatings for lithium ion batteries, cathodes coated with the coatings, and lithium ion batteries incorporating the coated cathodes are provided. The coatings, which are composed of binary, ternary, and higher order metal oxides and/or metalloid oxides, can reduce the hydrofluoric acid (HF)-induced degradation of the electrolyte and/or cathodes, thereby improving the performance of lithium ion batteries, relative to lithium ion batteries that employ bare cathodes.

A basic embodiment of a lithium ion battery includes: a cathode; an anode in electrical communication with the cathode; an electrolyte disposed between the anode and the cathode; and a separator also disposed between the anode and the cathode.

The electrolytes are ionically conductive materials and may include solvents, ionic liquids, metal salts, ions such as metal ions or inorganic ions, polymers, ceramics, and other components. An electrolyte may be an organic or inorganic solid or a liquid, such as a solvent (e.g., a non-aqueous solvent) containing dissolved salts. Non-aqueous electrolytes can include organic solvents, such as, cyclic carbonates, linear carbonates, fluorinated carbonates, benzonitrile, acetonitrile, tetrahydrofuran, 2-methyltetrahydrofuran, γ-butyrolactone, dioxolane, 4 methyldioxolane, N,N-dimethylformamide, N,N-dimethylacetamide, N,N-dimethylsulfoxide, dioxane, 1,2-dimethoxyethane, sulfolane, dichloroethane, chlorobenzene, nitrobenzene, diethyleneglycol, dimethylether, and mixtures thereof. Example salts that may be included in electrolytes include lithium salts, such as $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y-1}SO_2)$, (where $x$ and $y$ are natural numbers), LiCl, LiI, and mixtures thereof.

The separators are typically thin, porous or semi-permeable, insulating films with high ion permeabilities. The separators can be composed of polymers, such as olefin-based polymers (e.g., polyethylene, polypropylene, and/or polyvinylidene fluoride). If a solid polymer electrolyte is used as the electrolyte, the solid polymer electrolyte may also act as the separator.

The anodes are composed of an active anode material that takes part in an electrochemical reaction during the operation of the battery. Example anode active materials include elemental materials, such as lithium; alloys including alloys of Si and Sn, or other lithium compounds; and intercalation host materials, such as graphite. By way of illustration only, the anode active material may include a metal and/or a metalloid alloyable with lithium, an alloy thereof, or an oxide thereof. Metals and metalloids that can be alloyed with lithium include Si, Sn, Al, Ge, Pb, Bi, and Sb. For example, an oxide of the metal/metalloid alloyable with lithium may be lithium titanate, vanadium oxide, lithium vanadium oxide, $SnO_2$, or $SiO_x$ (0<x<2).

The cathodes are composed of an active cathode material that takes part in an electrochemical reaction during the operation of the battery. The active cathode materials may be lithium composite oxides and include layered-type materials, such as $LiCoO_2$; olivine-type materials, such as $LiFePO_4$; spinel-type materials, such as $LiMn_2O_4$; and similar materials. The spinel-type materials include those with a structure similar to natural spinal $LiMn_2O_4$, that include a small amount nickel cation in addition to the lithium cation and that, optionally, also include an anion other than mangante. By way of illustration, such materials include those having the formula $LiNi_{(0.5-x)}Mn_{1.5}M_xO_4$, where $0 \leq x \leq 0.2$ and M is Mg, Zn, Co, Cu, Fe, Ti, Zr, Ru, or Cr.

The active cathode material is at least partially coated with a continuous or discontinuous cathode coating of the metal oxide and/or metalloid oxide. The metal oxides and metalloid oxides may be selected from compounds that are thermodynamically and electrochemically stable, and that do not contain radioactive elements. A material can be considered thermodynamically stable if it is on the convex hull in the chemical space of elements that make up the material, as described in the Example. A material is electrochemically stable if it is electrochemically inactive or substantially so. This can be determined by the charge and discharge potentials of the material. For example, materials having a charge potential ($-E_u$) greater than 3.5 V and a discharge potential ($E_d$) less than 3 V can be considered electrochemically stable, as illustrated in the Example. It is also advantageous if the cathode coating materials do not contain relatively rare elements, as measured by the Herfindahl-Hirschman Index (HHI). Thus, some embodiments of the cathode coating materials have an HHI index of less than 9000. The Example describes high-throughput density functional theory calculations that determine a set of 1315 compounds that meets these criteria. The list of 1315 coating materials can then be further filtered using "Multi-objective optimization" techniques, as described in the Example, to identify materials that are useful candidates for cathode coatings from the larger list of compounds. A lists of the 100 best cathode coating material candidates of each type, as discussed in more detail below, is provided in FIGS. 6A, 6B, and 6C.

The compounds include ternary and quaternary phosphates, borates, silicates, chlorates, vanadates, titanates, aluminates, and sulfates, as well as many other metal oxides and metalloid oxides. In addition, the cathode coating materials include binary metal oxides and metalloid oxides, including oxides of transition metals and noble metals.

The borates are compounds of boron, oxygen, and one or more additional metal and/or metalloid elements. Examples of borates include, for example, those having $BO_3^{3-}$ groups, $BO_4$ groups, diboroates ($B_2O_5^{4-}$), triborates ($B_3O_7^{5-}$), tetraborates ($B_4O_9^{6-}$), and those having a $B_5O_{10}^{5-}$ groups.

The phosphates are compounds of phosphorus, oxygen, and one or more additional metal and/or metalloid elements. Examples of phosphates include, for example, those having $PO_4^{3-}$ groups, perphosphates ($PO_5^{3-}$), those having $PO_3^{4-}$ groups, and those having $P_2O_7^{4-}$ groups.

The silicates are compounds of silicon, oxygen, and one or more additional metal and/or metalloid elements. Examples of silicates include, for example, those having $SiO_2^{3-}$ groups, those having $SiO_3^{3-}$ groups, and those having $SiO_4^{2-}$ groups.

Similarly, the titantates are compounds of titanium, oxygen, and one or more additional metal and/or metalloid elements; the vanadates are compounds of vanadium, oxygen, and one or more additional metal and/or metalloid elements; the aluminates are compounds of aluminum, oxygen, and one or more additional metal and/or metalloid elements; the sulfates are compounds of sulfur, oxygen, and one or more additional metal and/or metalloid elements, and the chlorates are compounds of chloride, oxygen, and one or more additional metal and/or metalloid elements.

The cathode coatings may protect the cathode active material in at least one of three ways: by acting as a physical barrier; by acting as an HF scavenger; and/or by acting as an HF-barrier. Physical barriers: In systems where HF-attack is not the dominating degradation mechanism, such as low-moisture electrolyte systems, a simple physical barrier between the cathode and electrolyte may be sufficient to suppress degradation of the cathode. The 1315 compounds in Table 3 are physical barrier-type coatings. HF-scavengers: In systems where HF is present in the electrolyte, and the coating is applied via more conventional processes, where surface coverage and morphology cannot be controlled precisely, a coating material that preferentially reacts with HF can provide active cathode protection. Such HF scavenger coatings can sacrificially protect the cathode where the cathode is exposed to the electrolyte. HF-barriers: In systems where HF is present in the electrolyte, and complete surface coverage of cathode particles can be attained during the coating process, e.g., with atomic-layer-deposition (ALD), an HF-barrier functionality may be more effective in suppressing the degradation of the cathode compared to other functionalities above. Without wishing or intending to be bound to any particular theory of the inventions, it is believed that if such a pinhole-free coating is inert to HF (i.e., has a positive free energy for reacting with HF), it can retain its coverage and integrity more effectively as opposed to an HF-scavenger coating that is constantly consumed by reacting with HF.

HF-Scavenging type coatings include those for which the magnitude of free energy of the HF scavenging reaction ($G_{s-HF}$) is less than one, as described in the Example. HF-Barrier type coatings include those for which the magnitude of free energy of the HF scavenging reaction ($G_{s-HF}$) is greater than one, as described in the Example.

A list of the 100 most promising cathode coating materials across the three types of coatings, based on the multi-objective optimization described in the Example, is shown in the table of FIGS. 6A, 6B, and 6C. For each of the three types of coatings, the top 30 cathode coating materials based on each of two multi-objective optimization methods (weighted sum and rank aggregation) can be identified.

For physical-barrier type coatings, the 30 most useful cathode coating materials identified by the weighted sum method are $TaBO_4$, $TaPO_5$, $HfO_2$, $TA_2O_5$, $WO_3$, $ZrO_2$, $HfSiO_4$, $WCl_2O_2$, $Sc_2O_3$, $BeO$, $NbPO_5$, $ZrSiO_4$, $ZrP_2O_7$, $ScOF$, $NbBO_4$, $Hf_2P_2O_9$, $CaTi_4P_6O_{24}$, $MgO$, $Ta_9VO_{25}$, $ReO_3$, $RePO_5$, $ScTaO_4$, $Sr_3P_2O_8$, $Nb_2O_5$, $LiAl_5O_8$, $CaSn_4P_6O_{24}$, $ScPO_4$, $ScBrO$, $Ba_3P_2O_8$, and $GeP_2O_7$. The 30 most useful physical-barrier cathode coating materials identified by the rank aggregation method are $MgO$, $TaPO_5$, $Sc_2O_3$, $WO_3$, $WCl_2O_2$, $RePO_5$, $Li_2BeSiO_4$, $ReO_3$, $Ta_2O_5$, $HfO_2$, $Li_2MgSiO_4$, $NbPO_5$, $LiAl_5O_8$, $Ta_9VO_{25}$, $Ba_3P_2O_8$, $ScOF$, $MoCl_4O$, $BaBe_2B_2O_6$, $Sr_3P_2O_8$, $TaBO_4$, $Ba_2LiB_5O_{10}$, $WBr_4O$, $Ti_4P_6PbO_{24}$, $MoPO_5$, $SrAl_2Si_2O_8$, $Ca_3B_2O_6$, $ZrO_2$, $Ta_2Mo_2O_{ii}$, $Li_2TiO_3$, and $Ca_2BClO_3$.

For HF-barrier type coatings, the 30 most useful cathode coating materials identified by the weighted sum method are $WO_3$, $WCl_2O_2$, $NbPO_5$, $ReO_3$, $ZrP_2O_7$, $RePO_5$, $NbBO_4$, $Hf_2P_2O_9$, $BaSO_4$, $GeP_2O_7$, $WBr_4O$, $CaSn_4P_6O_{24}$, $Nb_2O_5$, $MoCl_4O$, $SrSO_4$, $Cr_2O_3$, $SnO_2$, $MoPO_5$, $MoBr_2O_2$, $InP_3O_9$, $GeO_2$, $CsReO_4$, $NbCl_3O$, $RbReO_4$, $NaSn_2P_3O_{12}$, $BiPO_4$, $Sb_2PbO_6$, $Mn_2PO_4F$, $SnSe_2O_6$, $VSbO_4$. The 30 most useful HF-barrier cathode coating materials identified by the rank aggregation method are $WO_3$, $WCl_2O_2$, $MnFeH_4O_2F_5$, $MnGaH_4O_2F_5$, $ReO_3$, $MoCl_4O$, $RbLiSO_4$, $BaSO_4$, $MnTl_2H_2OF_5$, $CaSn_4P_6O_{24}$, $Hf_2P_2O_9$, $NbBO_4$, $NiCO_3$, $Li_2SO_4$, $ZrP_2O_7$, $RhO_2$, $NbCl_3O$, $ZnCr_2O_4$, $CrBO_3$, $MoBr_2O_2$, $CrP_3O_9$, $GeO_2$, $ReO_2$, $Sc_2S_3O_{12}$, $Mn_2PO_4F$, $Cs_2Nb_3Cl_7O_5$, $CaSO_4$, $CsTaP_2O_8$, $BiSeClO_3$, $Rb_2Nb_3Cl_7O_5$ For HF-scavenger type coatings, the 30 most useful cathode coating materials identified by the weighted sum method are $Sc_2O_3$, $MgO$, $TaBO_4$, $Ca_5B_3O_9F$, $HfO_2$, $TaPO_5$, $Sr_2Ta_2O_7$, $Mg_3B_2O_6$, $Sr_2MgB_2O_6$, $Ca_2Ta_2O_7$, $Ca_2TaAlO_6$, $Ta_2O_5$, $ScOF$, $Li_2CaGeO_4$, $Li_2MgSiO_4$, $Ca_2BClO_3$, $ZrO_2$, $Ca_2MgWO_6$, $CaMgSiO_4$, $MgAl_2O_4$, $Sr_2SiCl_2O_3$, $CaAlBO_4$, $MgScBO_4$, $CaTiO_3$, $Li_2SiO_3$, $CaMgSi_2O_6$, $Li_3NbO_4$, $BaBe_2B_2O_6$, $LiBO_2$, and $Ba_2TiSi_2O_8$. The 30 most useful HF-scavenger cathode coating materials identified by the rank aggregation method are $Li_2CaGeO_4$, $MgO$, $Sc_2O_3$, $Sr_2MgB_2O_6$, $Ca_2MgWO_6$, $Ca_2TaAlO_6$, $Ca_2Ta_2O_7$, $BeO$, $Sr_2Ta_2O_7$, $Li_2MgSiO_4$, $Ca_5B_3O_9F$, $HfO_2$, $CaMgSi_2O_6$, $Ca_2NbAlO_6$, $Li_4SeO_5$, $Mg_2TiO_4$, $Mg_3B_2O_6$, $ZrSiO_4$, $CaFe_2O_4$, $CaSnO_3$, $Ca_2BClO_3$, $ZrO_2$, $HfB_2O_5$, $CaMgSiO_4$, $LiAl_5O_8$, $LiTi_2P_3O_{12}$, $Sr_2NbFeO_6$, $TaBO_4$, $CaAlBO_4$, and $HfGeO_4$.

Of these cathode coating materials, certain materials may be particularly well-suited for use as protective cathode coatings based on the abundance of the raw materials used to make them and overall processing costs. For example, in some embodiments of the coated cathodes, the coating will comprise a material selected from: $ZrO_2$, $Sc_2O_3$, MgO, $HfO_2$, $Ta_2O_5$, $WO_3$, $TaBO_4$, $TaPO_5$, $NbPO_5$, and $LiAl_5O_8$, which are particularly useful as physical barrier coatings; from $WO_3$, $NbBO_4$, $BaSO_4$, $ZrP_2O_7$, $Mn_2PO_4F$, and $CaSn_4(PO_4)_6$, which are particularly useful for the HF-barrier coatings; or from $Ca_5(BO_3)_3F$, $Mg_3(BO_3)_2$, $CaAlBO_4$, $Li_2MgSiO_4$, $CaMgSiO_4$, $CaMgSi_2O_6$, $Ca_2ClBO_3$, $Li_2SiO_3$, $Li_3NbO_4$ and $LiBO_2$, which are particularly useful as HF-scavenger coatings.

The compounds can be synthesized and formed as coatings using known methods for forming coatings on cathodes. For example, metal oxides and metalloid oxides, such as $HfO_2$, $WO_3$, BeO, $ReO_3$, $GeO_2$, and $RhO_2$ can be applied to the cathode active material via atomic layer deposition (ALD) using known precursors. Other methods for forming coatings include the solution phase reaction of a cation precursor with an anion precursor in the presence of the cathode active material.

For example, a coated cathode can be made by forming a reaction mixture that includes the cathode active material, a cation precursor, and an anion precursor in a solvent and initiating a precipitation reaction between the cation precursor and the anion precursor to form the cathode coating material on the cathode active material. Examples of cation precursor materials include metal salts and examples of anion precursor material include ionic compounds that contain the anionic component of the cathode coating material. For example, for a phosphate coating, the anion precursor would include phosphate anions; for a borate coating the, anion precursor would include borate anions; etc. This type of coating methods is illustrated in U.S. patent application publication numbers 2017/0012284 and 2016/0190585. Alternatively, the cathode coating compounds can be formed in the absence of the cathode active material and subsequently combined with the cathode active material to form a composite in which the cathode coating materials are in contact with and at least partially surround particles of the cathode active material. This type of coating method is described in U.S. patent application publication number 2016/0190585. The coating methods can, optionally, include grinding the mixture of cathode coating material and cathode active material and calcining the product, as described in U.S. patent application publication number 2014/0106223.

The coatings can also be formed using sol-gel techniques. For example, the surface of an cathode active material, such as $LiCoO_2$, can be coated with binary oxides via sol-gel route using techniques such as those described in J. Cho et al., Electrochem. Solid-state Lett. 3, 362 (2000); and J. Cho et al., Chem. Mater. 12, 3788 (2000). Typically, powders of the synthesized cathode active material (e.g., $LiCoO_2$) are dispersed in an alcohol (e.g., isopropanol, ethanol, etc.) or other suitable solvent in which a metal-containing salt precursor (e.g., tin ethyhexanoisopropoxide and aluminum ethylhexanoate diisopropoxide) can dissolve. The resulting gel is then dried and heated in a furnace. The sol-gel method also can be used to form ternary oxide coating on cathode active materials, as described in J. Cho et al., Electrochem. Solid-state Lett. 2, 607 (1999). For example, the cathode active materials (e.g., $LiMn_2O_4$) can be immersed in a solution containing a cation precursor and an anion precursor, then the gel solution is heated in a furnace to achieve the cathode coating on the cathode active material.

Wet-chemical processes also can be used to form the cathode coatings. An illustrative example of a wet chemical process is described in S. Myung et al., Chem. Mater. 17, 3695 (2005) for the formation of an $Al_2O_3$ coating on $Li[Li_{0.05}Ni_{0.4}Co_{0.15}Mn_{0.4}]O_2$ cathode active material particles. In this process, a cation precursor is dissolved in an organic solvent, such as ethanol, at or near room temperature and that solution is slowly added to a solution of the cathode active material. The mixture is then heated with stirring and the resulting coated cathode material is subsequently fired at a high temperature to produce coated particles of the active cathode material.

Other oxide coating techniques can also be employed. These electrostatic spray deposition (EDS), as illustrated in K. Y. Chung et al., J. Electrochem. Soc. 152, A791 (2005), and mechanochemical process, as illustrated in S. Kim et al., J. Electroceram. 30, 159 (2013); and J.-K. Noh et al, Sci. Rep. 4, 4847 (2014). In an EDS process, cathode active materials are treated with metal-containing nitrate compounds, which serve as precursors to the cathode coating material. In a mechanochemical process (also known as a high-energy ball-milling process) a surface coating is applied on powders of a cathode active material, as illustrated in Kim et al. and J.-K. Noh et al., which describe $Li_2MnO_3$ cathode active materials coated with Cr-containing oxides; and $LiNi_{0.5}Mn_{0.3}Co_{0.2}O_2$ (NMC) cathode active material poweders with the average size of ~10 μm coated with a $Li_2MnO_3$ shell. Other suitable synthetic routes include: co-precipation route, as described in Y.-K. Sun et al., Nat. Mater. 8, 320 (2009); and Y.-K. Sun et al., Nat. Mater. 11, 942 (2012); atomic layer deposition (ALD), as described in J. Lu et al., Nat. Commun. 5, 5693 (2014) and J. Park et al., Chem. Mater. 26, 3128 (2014); and thin film deposition, as described in G. Tan et al., Nat. Commun. 7, 11774 (2016).

The coatings can be sufficiently thick that that the bulk of the coating away from the interface between the cathode active material and the cathode coating material preserves the nominal coating composition. Or the coatings can be sufficiently thin that the coating process allows the reaction of the bulk of the coating material with the cathode. By way of illustration, some embodiments of the cathode coatings have a thickness in the range from 0.1 to 1000 nm, including thicknesses in the range from 0.2 to 500 nm, and from 1 to 200 nm. The amount of cathode coating material based on weight may be, for example, in the range from 0.01 to 40% based on the mass of the cathode active material. This includes cathode coatings in which the amount of cathode coating material is in the range from 0.1 to 30%, based on the mass of the cathode active material, and further includes cathode coatings in which the amount of cathode coating material is in the range from 1 to 15%, based on the mass of the cathode active material.

For coatings in which the coating is thin and/or the coating process allows the reaction of the bulk of the coating material with the cathode, it can be advantageous to tailor the cathode coating material to the particular cathode active material being used. This can be accomplished using a model where the cathode active material is present in the chemical space, as described in detail in the Example. Table 2 lists compounds that can be used as cathode coating materials for $LiCoO_2$ cathodes and $LiMn_2O_4$ electrodes. The compounds identified as "optimal" and "nearly optimal" are both considered to be suitable cathode coating materials for their respective electrodes. By way of illustration, $Li_2CaSiO_4$, $CaIn_2O_4$, $Li_4H_3BrO_3$, and $Li_4H_3ClO_3$ are useful cathode coatings for $LiCoO_2$ cathode active materials; and $Li_2TiSiO_5$, $Ca_2Mn_3O_8$, $Li_2MnO_3$, $Ba_2TiSi_2O_8$, and $Ba_2Ti_4Fe_2O_{14}$ are useful coating materials for $LiMn_2O_4$ cathode active materials.

EXAMPLE

This example describes a comprehensive HT materials design framework to discover new cathode coatings by combining the Open Quantum Materials Database (OQMD), a large collection of HT DFT calculations of ~300,000 inorganic materials, with reaction models to describe thermodynamic stability, electrochemical stability and HF-reactivity for any oxygen-bearing coating with non-intuitive, fully automated prediction of reaction products. The description can also be found in Aykol et al., High-throughput computational design of cathode coatings for Li-ion batteries, Nature Comm. 7, Article number: 13779 (2016) and its Supplementary Information (SI), the entire disclosure of which is incorporated herein by reference.

With this framework, coatings were designed with various functionalities geared towards specific battery chemistries; namely, 1) physical-barriers for acid-free electrolytes, 2) HF-barriers for cathode particles fully covered with coatings, and 3) HF-scavengers for particles with patchy coatings requiring active protection from HF-attack. More than 130,000 oxygen-bearing materials (oxides and oxyanion compounds) available in the OQMD were screened, and multi-objective optimization methods, namely weighted-sum and rank aggregation, were used to select the best candidates for each coating category. It was further shown that coatings optimized for a particular cathode material (e.g., for layered-$LiCoO_2$ and spinel-$LiMn_2O_4$) can be designed by incorporating the cathode active material itself into the chemical space; i.e., considering the cathode-coating reactivity and including the cathode active material in all chemical reactions of the framework.

The Coating Design Framework
Types of Cathode Coatings

Thermodynamic and electrochemical stability are essential for a coating to ensure that the material can be synthesized experimentally, and remain intact (electrochemically inactive) in the battery, respectively. On the other hand, depending on the acid content of the electrolyte and the coating morphology, different HF-related functionalities can be assigned to a given coating material, as listed in Table 1. Chen et al. outlined different functionalities a cathode coating may have, including physical barrier and HF-scavenger coatings. (See, Chen, Z.; Qin, Y.; Amine, K.; Sun, Y.-K. Journal of Materials Chemistry 2010, 20, 7606.) Here, both of these coating types are considered, as well as a new third type, HF barriers.

TABLE 1

Coating functionalities and corresponding attributes used in the HT coating design framework

| Functionality | Thermodynamic stability | Electrochemical stability | HF reactivity |
|---|---|---|---|
| Physical barrier | High | High | — |
| HF-scavenger | High | High | High |
| HF-barrier | High | High | Low |

Reaction Models

To design a coating material with the target functionalities described above, three main attributes were considered, as listed in Table 1: (i) thermodynamic stability of the coating, (ii) electrochemical stability of the coating, and (iii) the reactivity of the coating with HF. Here, thermodynamic stability was defined as whether the material is on the convex-hull (i.e., whether the compound is lower in energy than all other linear combinations of compounds at the same composition), which can be readily acquired from the OQMD phase diagrams. As an example, the ternary Li—Ti—O phase diagram obtained from OQMD is shown in FIG. 1A, where the stable phases such as $TiO_2$, $LiTi_2O_4$, $LiTiO_2$, $Li_2TiO_3$ and $Li_4TiO_4$, make up the three-phase coexistence regions, and all unstable phases decompose into a combination of such stable phases. Of the ~130,000 oxygen-bearing materials calculated in the OQMD, ~5,200 are thermodynamically stable against decomposition into other phases. To evaluate the attributes (ii) and (iii) specific reactions were constructed and their energies calculated.

Electrochemical stability of a cathode coating has two components; i.e., stability under reducing (discharge) and oxidizing (charge) conditions, as illustrated schematically in FIG. 2. For an oxygen-bearing cathode coating ($A_aB_bC_c$:::) $O_x$, a generic discharge reaction can be written as:

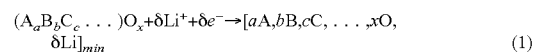

$$(A_aB_bC_c \ldots)O_x + \delta Li^+ + \delta e^- \rightarrow [aA, bB, cC, \ldots, xO, \delta Li]_{min} \quad (1)$$

where [aA, bB, cC, . . . xO, δLi] simply denotes the composition imposed by the reactants. The subscript min implies that the products are determined as the minimum energy combination of phases in the OQMD at this composition, from which the discharge reaction energy (or the discharge potential, $E_d$) is also subsequently calculated. (See, Akbarzadeh, A. R.; Ozolins, V.; Wolverton, C. Advanced Materials 2007, 19, 3233, 3239.) Here, δ denotes a dilute amount, in the sense that the composition [aA, bB, cC, . . . xO, δLi] remains within the first phase-region formed by the coating ($A_aB_bC_c$ . . . )Ox and other stable phases towards the Li corner of the phase diagram. In this phase region, the Li chemical potential will be at its lowest value among all possible values along the composition path from the coating towards the Li-corner of the phase diagram, and therefore this methodology ensured obtaining the highest $E_d$ for the given compound. This procedure of calculating $E_d$ is illustrated in FIG. 1B with the example of the candidate $Li_2TiO_3$. Along the lithiation path of $Li_2TiO_3$, the highest lithiation voltage was attained by the reaction $Li_2TiO_3 + \frac{1}{2}Li \rightarrow \frac{1}{2}LiTiO_2 + \frac{1}{2}Li_4TiO_4$ in the first phase region towards the Li corner. For a coating to be electrochemically stable with respect to reduction, the discharge potential, $E_d$, calculated for the reaction in Eq. 1 needs to be low, at least lower than the discharge voltage cutoff of the cathode as shown in FIG. 2. The potential of Eq. 1 was calculated with respect to the Li/Li+ anode.

Similar to the discharge reaction, a generic charge reaction for a ($A_aB_bC_c$ . . . )$O_x$ coating can be written as:

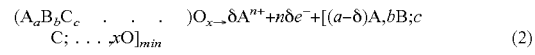

$$(A_aB_bC_c \ldots xO]_{min} \rightarrow \delta A^{n+} + n\delta e^- + [(a-\delta)A, bB, cC; \ldots, xO]_{min} \quad (2)$$

Products of this reaction, except $A^{n+}$, were determined the same way as in Eq. 1. The ion $A^{n+}$ denotes the component with the highest dissolution tendency, which was found by calculating the reaction potential for all elements (A, B, C, etc.) in the compound and choosing the highest one as the "charge" potential, $E_c$. For a given element, all possible oxidation states n with available electrochemical data were considered. For example, for $Li_2TiO_3$, the highest $E_c$ was found to correspond to the dissolution of $Li^+$ via this reaction: $Li_2TiO_3 \rightarrow Li^+ + e^- + \frac{1}{5}LiO_3 + \frac{1}{5}Li_4Ti_5O_{12}$. When Li was present in a compound as in this example, it usually was the element with the highest dissolution tendency, since it has one of the highest standard oxidation potentials (3.04 V) among all elements. When the material did not contain Li, however, oxidation takes place via dissolution of one of the existing elements. For example, for $Mn_2VPO_7$ the highest $E_c$ was found to correspond to the dissolution of $Mn^{2+}$ via this reaction: $Mn_2VPO_7 \rightarrow \frac{1}{2}Mn^{2+} + e^- + \frac{1}{2}MnV_2O_6 + MnPO_4$. For an electrochemically stable coating, $E_c$ needs to be sufficiently negative (i.e., unfavorable), and in fact its magnitude needs to be at least larger than the charge cutoff of the cathode as shown in FIG. 2. Similar to $E_d$, $E_c$ was calculated with respect to the Li/Li$^+$ anode.

The third attribute considered was the reactivity of the coating with HF described by the reaction:

$$(A_aB_bC_c\ldots)O_x + \delta HF \rightarrow [aA, bB, cC, \ldots, xO, \delta H, \delta F]_{min} \quad (3)$$

where $\delta$ and the products were determined with a procedure similar to the previous reactions. Again for $Li_2TiO_3$ as an example, the HF-scavenging reaction was found to be $Li_2TiO_3 + 6/5\ HF \rightarrow \frac{1}{5}Li_4Ti_5O_{12} + 6/5\ LiF + 3/5\ H_2O$. The measure of HF-reactivity was taken as the magnitude of the free energy of the HF-scavenging reaction, $G_{s\text{-}HF}$.

Finally, for HF-scavenger coatings, Eq. 3 will produce fluorides, which are likely to have discharge potentials higher than the oxide coating itself (See, Aykol, M.; Kirklin, S.; Wolverton, C. Advanced Energy Materials 2014, 4, 1400690.) Therefore, for HF-scavenger coating design, $E_d$(products) was further included as a criterion, which is basically the potential calculated by replacing $(A_aB_bC_c\ldots)O_x$ in Eq. 1 with the mixture $[aA, bB, cC, \ldots, xO, \delta H, \delta F]_{min}$ obtained as the products of the reaction in Eq. 3. As an example, for an $Li_2TiO_3$ coating, this reaction was found to be $Li_4Ti_5O_{12} + (6LiF + 3H_2O) + 3/2\ Li \rightarrow 2Li_2TiO_3 + 3/2\ LiTi_2O_4 + (6LiF + 3H_2O)$. In this particular example, the species in the parenthesis, LiF and $H_2O$, did not participate in the reaction and remained intact. As shown throughout this Example, reactions became complex and non-intuitive even for ternary candidate coatings, and the whole procedure described here was fully-automated.

Methods

Methodology of Calculating Reaction Free Energies

This section describes the approach to calculating the free energies of reactions by combining DFT formation energies in the OQMD, experimental thermochemical data for gaseous species and experimental electrochemical data for solvated ions. The standard free energy of a reaction was obtained as:

$$\Delta_r G^0 = \Sigma_i^{products} v_i \Delta_f G_i^0 - \Sigma_i^{reactants} v_i \Delta_f G_i^0 \quad (4)$$

where $v_i$ and $v_i \Delta_f G_i^0$ denote the stoichiometric coefficient the species j takes in the reaction, and its standard free energies of formation, respectively. For solid compounds, $\Delta_f G_i^0$ can be written as:

$$\Delta_f G^0(\text{compound}) = \Delta_f H^0 - T(S_{compound}^0 - \Sigma_{ref,j} x_j S_j^0) \quad (5)$$

where j denotes the elemental reference states, x denotes the amount of element j in the compound, and H and S denote enthalpy and entropy, respectively. For solid phases, it was assumed that pV contributions were negligible, and $\Delta_f H^0$ was approximated using DFT formation energies in the OQMD. Near room temperature, for solids it was assumed that $S_i^0 \approx 0$ (including the compound and solid elemental references) compared to that of the gaseous reference states. For the elements with gaseous reference states ($O_2$, $F_2$, $Cl_2$, $H_2$ and $N_2$), tabulated standard room temperature entropies available in the JANAF tables were used. (See, Chase, M. W.; Davies, C. A.; Downey, J. R.; Frurip, D. J.; McDonald, R. A.; Syverud, A. N. J. Phys. Chem. Ref. Data. 1985, 14, Suppl. 1). Therefore, $\Delta_f G^0$ of a compound was approximated as,

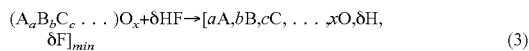
$$\Delta_f G^0(\text{compound}) \approx \Delta_f H^{0,DFT} + T\Sigma_{gas,j} x_j S_j^{0,exp} \quad (6)$$

For the standard free energy of formation of a solvated ion, $\Delta_f G^0(\text{ion})^{n+}$, the standard oxidation potential of the ion $\varepsilon(\text{ion})^{n+}$ using the Nernst relation, $$\Delta_f G^0(\text{ion})^{n+} = -nF\varepsilon(\text{ion})^{n+} \quad (7)$$

was used, where F is the Faraday's constant and n is the valence state of the ion in solution. For elemental reference states we have by definition, $$\Delta_f G^0(\text{el.ref.}) = 0 \quad (8)$$

Using $\Delta_r G^0$ and $\Delta_f G^0$ defined above, free energy of a given reaction was calculated as, $$\Delta_r G = \Delta_r G^0 + RT\ln\frac{\Pi_{products,i} a_i^{v_i}}{\Pi_{reactants,i} a_i^{v_i}} \quad (9)$$

All gases were assumed to be at standard state pressure of 1 atm. The activities of solid phases were assumed unity. Since the electrolyte was Li-based, $Li^+$ activity was assumed unity, whereas for the other dissolving ions, a small activity of $a_{ion \neq Li} = 10^{-6}$ was assumed to approximate the actual dilute concentrations in the electrolyte. Half or full cell potentials could further be obtained using the Nernst relation as, $$E_r = (\Delta_r G)/zF \quad (10)$$

where z is the number of electrons transferred in the reaction. A Li metal anode (Li/Li$^+$) was assumed for all voltage calculations. Standard oxidation potentials for elements $\varepsilon(\text{ion})^{n+}$ (with respect to standard hydrogen electrode), and room temperature free energies of formation of liquid $H_2O$, $\Delta_f G^0(H_2O)$, and dilute HF in electrolyte, $\Delta_f G^0(\text{HF, electrolyte})$, were obtained from the National Bureau of Standards tables. (See, Wagman, D.; Evans, W.; Parker, V.; Schumm, R.; Halow, I.; Bailey, S.; Churney, K.; Nuttall, R. J. Phys. Chem. Ref. Data 1982, Vol. 11, Suppl. 2.)

The HT materials design framework presented here relies on the availability of accurate formation energies to calculate compound stabilities and reaction energies. Accurate and efficient computation of formation energies of inorganic materials using DFT in a HT fashion is an ongoing pursuit. Current methodologies, such as the OQMD and Materials Project combine DFT, DFT+U with optimal U parameters, and chemical potential corrections to mitigate systematic errors and bridge DFT and DFT+U calculations. (See, Jain, A.; Ong, S. P.; Hautier, G.; Chen, W.; Richards, W. D.; Dacek, S.; Cholia, S.; Gunter, D.; Skinner, D.; Ceder, G.; Persson, K. A. APL Materials 2013, 1, 011002.) For all solid phases, the formation energies of materials available in the OQMD were used, which were calculated using the Vienna Ab-initio Simulation Package, with the settings described in detail by Kirklin et al. (See, Kresse, G.; Hafner, J. Phys. Rev. B 1994, 49, 14251; Kresse, G.; Furthmeuller, J. Phys. Rev. B 1996, 54, 11169; Kirklin, S.; Saal, J. E.; Meredig, B.; Thompson, A.; Doak, J. W.; Aykol, M.; Ruhl, S.; Wolverton, C. npj Computational Materials 2015.) While the vibrational zero-point energies (ZPE) of atoms such as hydrogen in hydrogen bearing compounds may be non-negligible, it was assumed that an averaged ZPE was included in the OQMD formation energies as the corresponding chemical potential corrections of gaseous reference states including $H_2$ were fit to experimental data.

Materials Selection

Selecting the best candidates among thousands of materials based on multiple thermodynamic attributes is a multi-objective optimization problem (MOOP), which yields many non-dominated (Pareto-optimal) solutions. Here multiple strategies were implemented to select materials for target coating applications: (i) an initial screening to narrow down the search space, (ii) followed by two alternative procedures to address the MOOP: global weighted-sum objective and rank aggregation.

Screening

A series of preliminary screens were applied prior to solving the MOOP to filter out materials that do not pass the basic thermodynamic, electrochemical, and reactivity requirements, as listed in Table 1. Thermodynamic stability, in fact, is a screen which reduced the number of candidate oxygen-bearing materials from ~130,000 to ~5,200, and significantly narrowed down the search space. For HF-scavenger coatings, a screen of $G_{s-HF}<0$ was applied, to ensure the coating provided the scavenging functionality. The lower limit for $G_{s-HF}$ was set as that of the basic oxide CaO as done previously, to eliminate materials with "excessive reactivity" against other components of the battery. (See, Aykol, M.; Kirklin, S.; Wolverton, C. Advanced Energy Materials 2014, 4, 1400690.) For HF-barrier coatings, a screen of $G_{s-HF}>0$ was adopted, so as not to allow this type of coating to react with HF. For all coatings, a 3 V upper limit for $E_d$, and a −3 V upper limit for $E_c$ (i.e., we look for materials with $E_d<3V$ and $-E_c>3$ V) were implemented. In addition, materials that contain radioactive elements and/or relatively rare elements were eliminated, using production and reserve Herfindahl-Hirschman index (HHI)<9000 as a proxy for availability. (See, Gaultois, M.; Sparks, T.; Borg, K.; Seshadri, R.; Boni_cio, W.; Clarke, D. Chemistry of Materials 2013, 25, 2911, 2920.)

Ranking Materials: Weighted-Sum Vs. Rank Aggregation

In the first strategy, a global weighted-sum objective function F(x) was used, $$F(x)=\Sigma_i w_i f_i(x) \quad (11)$$

where $w_i$ and $f_i$ denote the weight (or importance) and the scaled value of attribute i for a given coating candidate x, respectively. (See, Marler, R. T.; Arora, J. S. Structural and Multidisciplinary Optimization 2010, 41, 853, 862.) For each coating category a different set of scaled attributes, $f_i$, was considered in F. For physical-barrier, HF-barrier and HF-scavenger coatings, these attribute sets were $\{E_c, E_d\}$, $\{E_c, E_d, G_{s-HF}\}$ and $\{E_c, E_d, E_d \text{ (products)}, G_{s-HF}\}$, respectively.

This method mapped the MOOP onto a single global objective F, which gave an overall "performance" score for a coating candidate which was used to rank the materials. The weighted-sum method, however, required several critical assumptions to be made. First, $w_i$—the relative importance of an attribute—had to be defined a priori, which often required higher-level information about the problem, other than just the attributes themselves. Second, the final value of F(x) was not invariant under scaling or transformation of attribute data with different methods. Distribution of scaled attributes were not necessarily similar either, i.e., they may have been skewed, resulting in an inherent bias (intrinsic weights) in F(x). For the weighted-sum analysis, equal $w_i$ were assumed, and a min-max normalization was used to scale the original (unsealed) $f_x'$ to a range of [0,1], i.e., $f_i(x)=(f_x'-f_{i,min}')/(f_{i,max}'-f_{i,min}')$. For $f_i(x)$, it was assumed that 0 and 1 corresponded to the "worst" and the "best" extrema of attribute i in the data set, respectively.

Due to the above-mentioned assumptions and pretreatments required in the weighted-sum approach, Rank Aggregation was implemented as an alternative materials selection method that did not require data scaling or transformation. (See, Pihur, V.; Datta, S.; Datta, S. BMC Bioinformatics 2009, 10, 62.) In this approach, separate lists of material rankings were generated for each attribute i, and then a super-list that was as close as possible to all these individual lists was found. To measure the distance between two lists a and b, Spearman's footrule distance, defined as $d(a,b)=\Sigma_x|r_x^a-r_x^b|$ where $r_x^a$ is the rank of material x in list a, was used. A brute-force approach to rank aggregation becomes intractable even for small lists of about 10 to 15 candidates, and therefore a cross-entropy Monte Carlo method, available in the RankAggreg package by Pihur et al., was used (See, Pihur, V.; Datta, S.; Datta, S. BMC Bioinformatics 2009, 10, 62).

Results and Discussion

Multi-Objective Optimization for Material Selection

The calculated coating design attributes are presented in FIGS. 3A, 3B, 3C, 3D, 3E, and 3F as a matrix plot for the 5,200 thermodynamically stable oxides and oxyanion compounds in the OQMD. For physical barrier coatings, the only relevant panel is $E_c$ vs. $E_d$, for HF-barrier coatings the relevant panels are $E_c$ vs. $E_d$, $E_c$ vs. $G_{s-HF}$ and $E_d$ vs. $G_{s-HF}$, and for HF-scavenger coatings, all panels are relevant. For all these coating categories, the lower values are optimal for all attributes, except the $G_{s-HF}$ of HF-barrier, which by definition (Table 1) needs to be high. $E_c$ vs. $E_d$ is the key panel that describes the electrochemical stability for all types of coatings. Since both $E_c$ and $E_d$ should be low for an electrochemically stable material, a candidate with the ideal combination of these attributes should be towards the lower left corner of the panel. However, there was roughly an opposite trend between $E_c$ and $E_d$; that is, an improvement (decrease) in $E_d$ often led to an increase in $E_c$ of a candidate coating. Therefore, $E_c$ and $E_d$ are objectives that were mostly conflicting.

Similar conflicting trends also existed among other attributes. For HF-scavenger coatings, attribute pairs in all three panels in the first row shoed conflicting trends in FIG. 3. Products of HF-scavenging reactions (i.e., mixture of fluorinated and/or hydrated metal oxides) clearly reacted more favorably with Li than the oxides themselves and yielded higher lithiation potentials, as evident from the panel showing $E_d$ vs. $E_d$(products) in FIG. 3. Plots of $E_d$ against $E_d$(products), as well as $E_d$ (or $E_d$ (products)) against $G_{s-HF}$ showed non-conflicting trends; i.e., materials with ideal attributes could be located at the lower left corner of each of these plots. These materials, however, clearly exhibited the highest $E_c$ values, and therefore are not promising candidates.

Due to the conflicting nature of attributes in the MOOP, and highly scattered data with no clear structure, it was not possible to find the best coating materials simply by a pairwise comparison of attributes. Thus, a preliminary screening of attributes was applied, as described in herein, followed by the two material selection methods; weighted-sum and rank aggregation to tackle this MOOP. For the ~5,200 thermodynamically stable candidates, screening reduced the number of physical-barrier, HF-barrier, and HF-scavenger coating candidates to 1315, 411 and 583, respectively, which were further ranked using the weighted-sum and rank aggregation methods to find the best candidates.

FIGS. 4A, 4B, 4C, 4D, 4E, and 4F show, for each coating type, the rankings of top 30 candidates obtained with the weighted-sum and rank aggregation methods, along with the global objectives (F(x)), and normalized attributes (f(x)) of the materials. For a given coating type, while the absolute ranks obtained with weighted-sum and rank aggregation were not necessarily identical, there was significant overlap between the lists obtained with these different methods. The f(x) and F(x) of the top materials in the rank aggregation lists were also found to be similar to those in the weighted-sum lists. Therefore, as two characteristically different MOOP methods yielded similar results, it was concluded that the predictions of the final top candidates did not depend strongly on the material selection method, and represent a viable set of solutions for the MOOP. The cathode coating materials recommended below appear in the top-list with both methods.

For all coating categories, a compromise between the conflicting attributes $E_d$ vs. $E_c$ is essential, and top coatings in FIGS. 4A through 4F were accordingly found to be scattered near the lower-left front of $E_d$ vs. $E_c$ in FIGS. 3A through 3F. Attribute pairs for the top HF-scavenger coatings from FIG. 4 were all scattered near the lower-left regions of data, whereas for HF-barriers, highly ranked coatings were near the lower-right fronts of $E_d$ (and $E_d$ (products)) vs. $G_{s-HF}$, as for that category $G_{s-HF}$>0 was more favorable. In general, it was observed that the distribution of materials ranked in the top 30 lists (FIGS. 4A-4F) in FIGS. 3A-3F was consistent with what was expected from the criteria defined in Table 1 for each coating category.

Figures 4A, 4D:
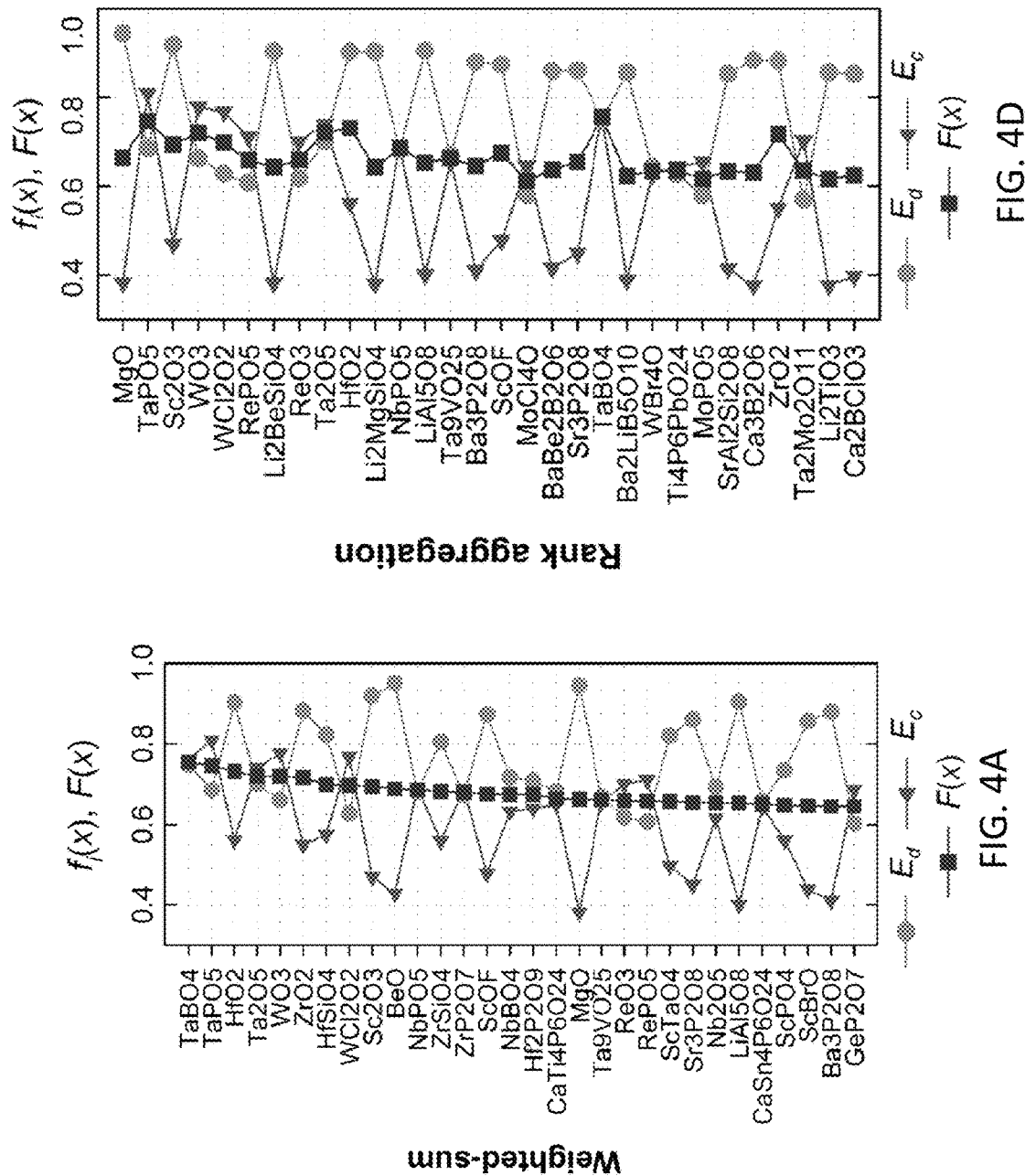
FIG. 4A: Material rankings for the top 30 physical barrier coatings obtained with the weighted-sum method.
FIG. 4D: Material rankings for the top 30 physical barrier coatings obtained with the rank aggregation method.
Figure 4E:
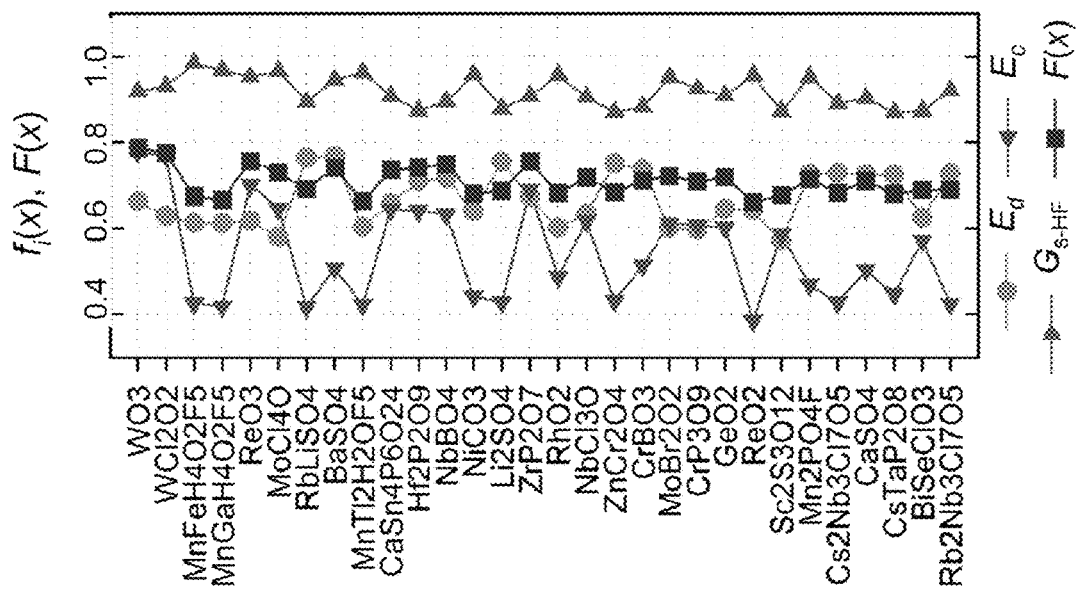
FIG. 4E: Material rankings for the top 30 HF-barrier coatings obtained with the rank aggregation method.
Figure 4B:
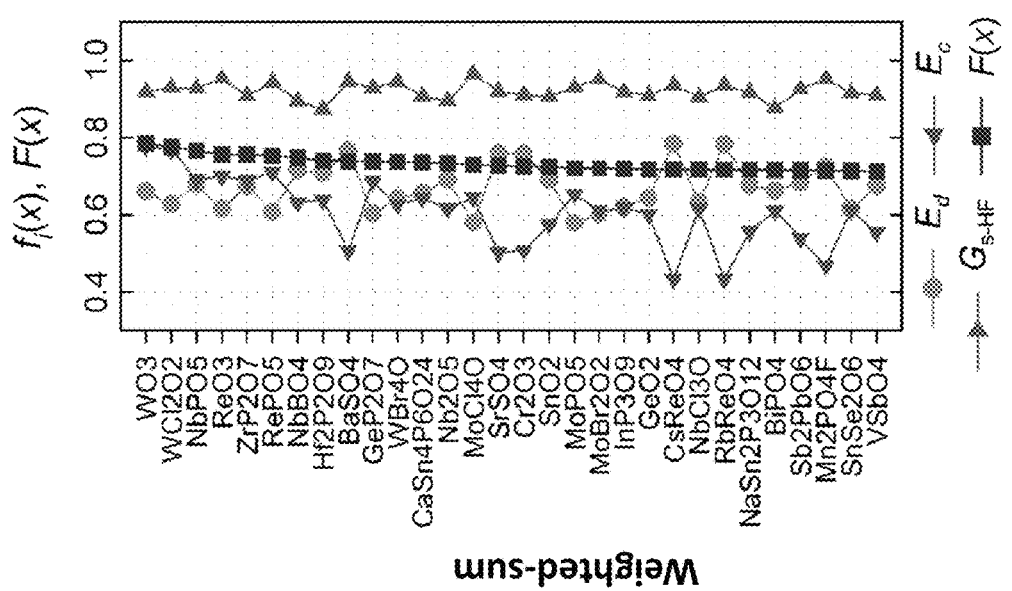
FIG. 4B: Material rankings for the top 30 HF-barrier coatings obtained with the weighted-sum method.

The physical barrier category was dominated by oxides, phosphates and a few borates of early d-block metals such as Ta, W, Hf, Zr, Nb and Sc in FIGS. 4A and 4D. Among the oxides, $HfO_2$, $Ta_2O_5$, $WO_3$, $ZrO_2$, $Sc_2O_3$, MgO, and $LiAl_5O_8$; among the phosphates, $TaPO_5$ and $NbPO_5$; and among the borates, $TaBO_4$ appear as useful physical barrier coatings in both weighted-sum and rank aggregation lists. The only additional attribute considered for the HF-barrier coatings compared to physical-barriers was low HF reactivity (i.e., positive $G_{s-HF}$), and therefore there is some overlap, especially among the metal-phosphates, between those ranked lists in FIGS. 4A, 4B, 4D, and 4E. In addition to $WO_3$, important candidates for the HF-barrier coating category include $NbBO_4$, $BaSO_4$, $ZrP_2O_7$, $Hf_2P_2O_9$, $Mn_2PO_4F$ and $CaSn_4(PO_4)_6$. Overall, 4d and 5d metal phosphates emerged as a new class of useful physical- and HF-barrier coatings. For the HF-scavenger category, while known effective HF-scavenger coatings such as MgO, $ZrO_2$ and the previously predicted $Sc_2O_3$ are in the top-lists, the rest of the promising compounds span an unexpectedly wide range of chemistries including oxides, borates, fluoroborates, oxyfluorides, chlorates and silicates of Li, Mg, Ca, and Sr. Many of these compounds have a Ta, W, Ti, Nb or Al component as well. Most of the HF-scavenger coating materials ranked in top-30 lists by both ranking methods, such as $Ca_5(BO_3)_3F$, $Mg_3(BO_3)_2$, $Sr_2Mg(BO_3)_2$, $TaBO_4$, $CaAlBO_4$, $Li_2MgSiO_4$, $CaMgSiO_4$, $CaMgSi_2O_6$, $Ca_2Ta_2O_7$, $Ca_2TaAlO_6$, $Ca_2ClBO_3$, $Ca_2MgWO_6$, $Li_2CaGeO_4$, and $SrTa_2O_7$, are unprecedented candidates that represent new classes of HF-scavenger coating materials beyond binary metal oxides. Some of the Li-bearing compounds such as $Li_2SiO_3$, $Li_3NbO_4$, $LiBO_2$, $Li_4SeO_5$ and $LiAl_5O_8$, appear only in either of the weighted-sum or rank aggregation lists, but they are useful since such compounds also can be good Li-ion conductors.

Figures 4C, 4F:
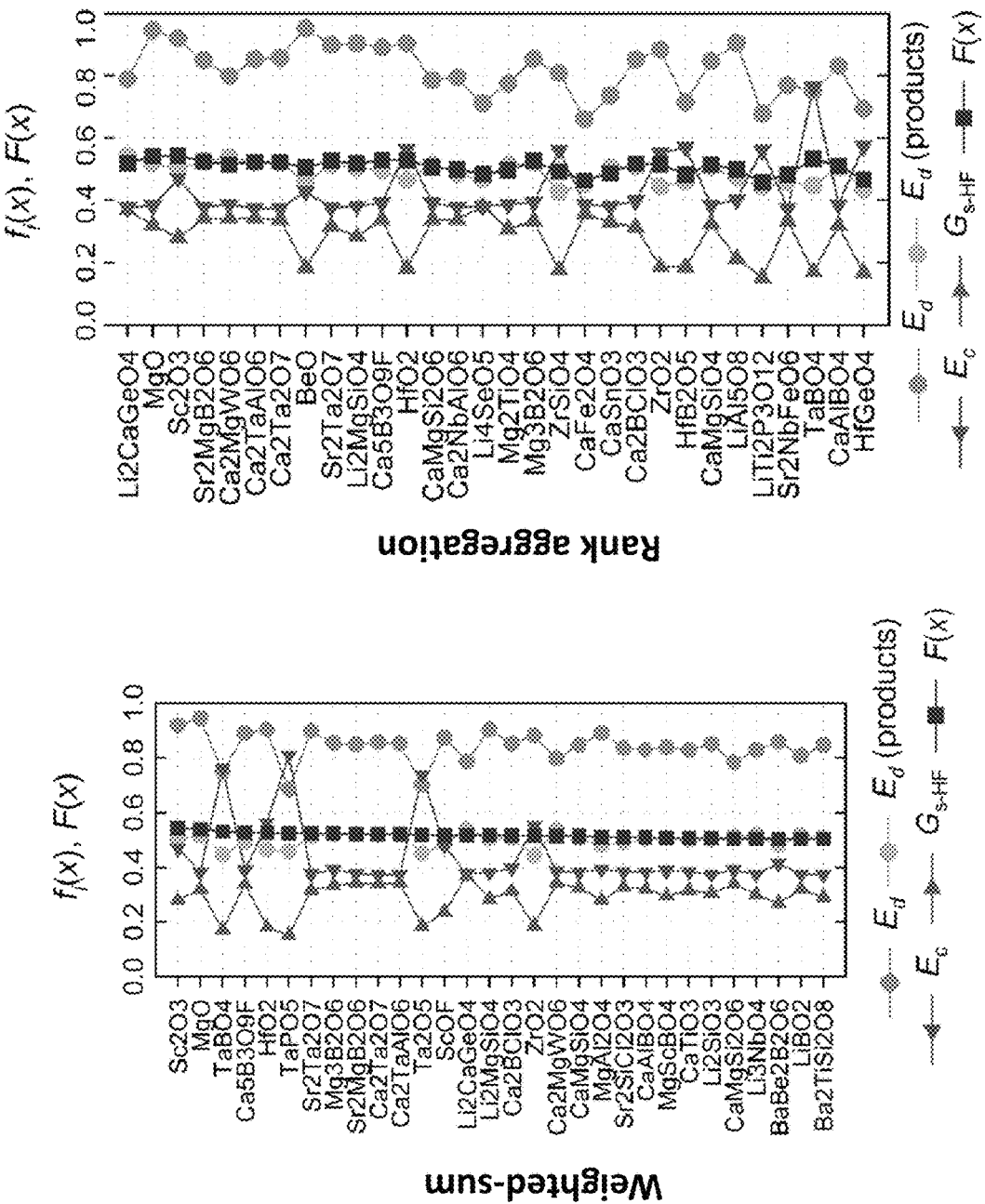
FIG. 4C: Material rankings for the top 30 HF-scavenger coatings obtained with the weighted-sum method.
FIG. 4F: Material rankings for the top 30 HF-scavenger coatings obtained with the rank aggregation method. Individual attributes, $f_i(x)$ and the resulting global objective $f(x)$ are given for each material. Individual attributes and global objectives are also given in the rank aggregation panels, to allow comparisons between each method. The highest-rank material is on top in each list. Note $f(x)$ of $G_{s\text{-}HF}$ denote opposite ideal limits for HF-barrier and HF-scavengers as defined in Table 1.
Figure 5A:
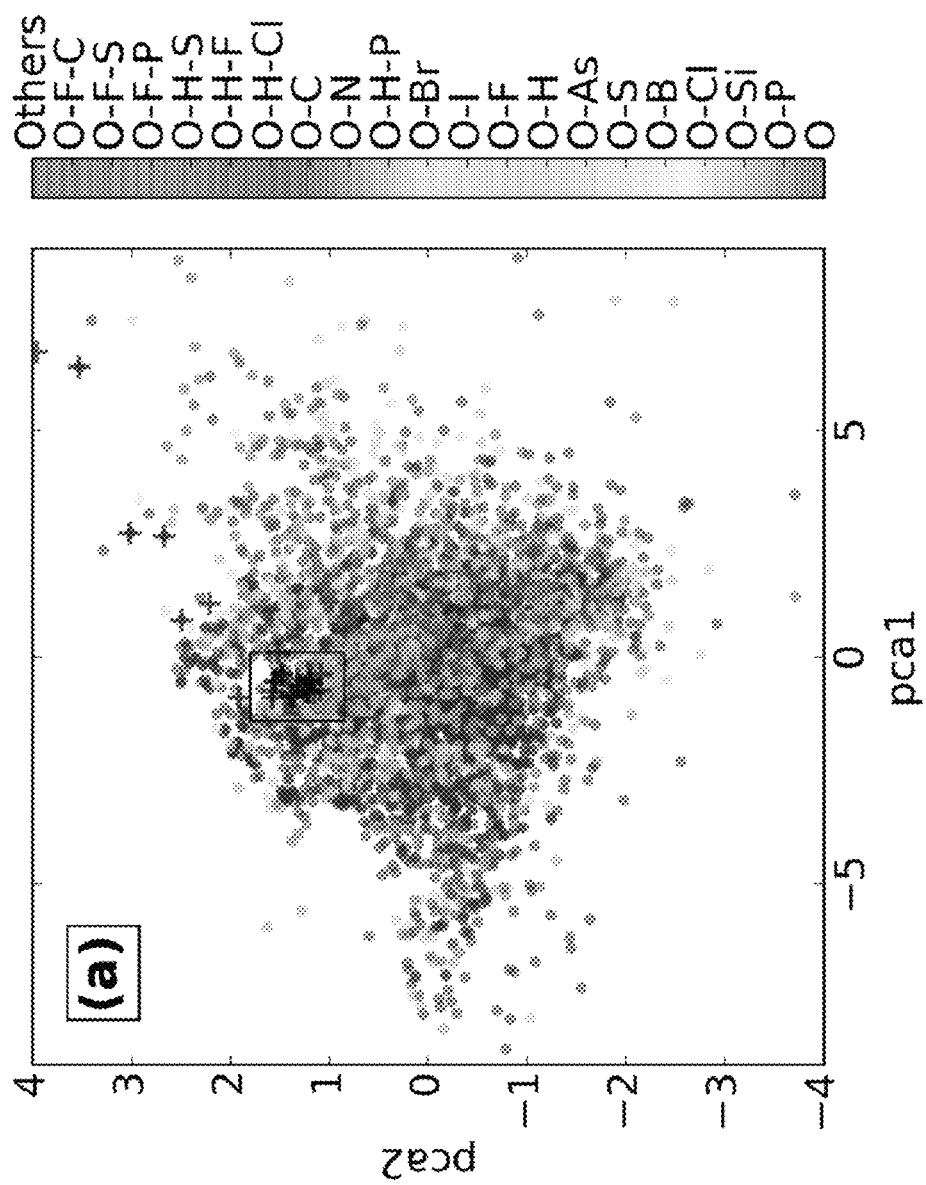
FIG. 5A: (a) Principal component analysis (PCA) for HF-scavenger coating attributes for the ~5,200 thermodynamically stable oxides. The promising HF-scavengers listed in FIG. 4 are marked with a "+" sign, and their approximate region in the plot is highlighted by a rectangular window.
Figure 5B:
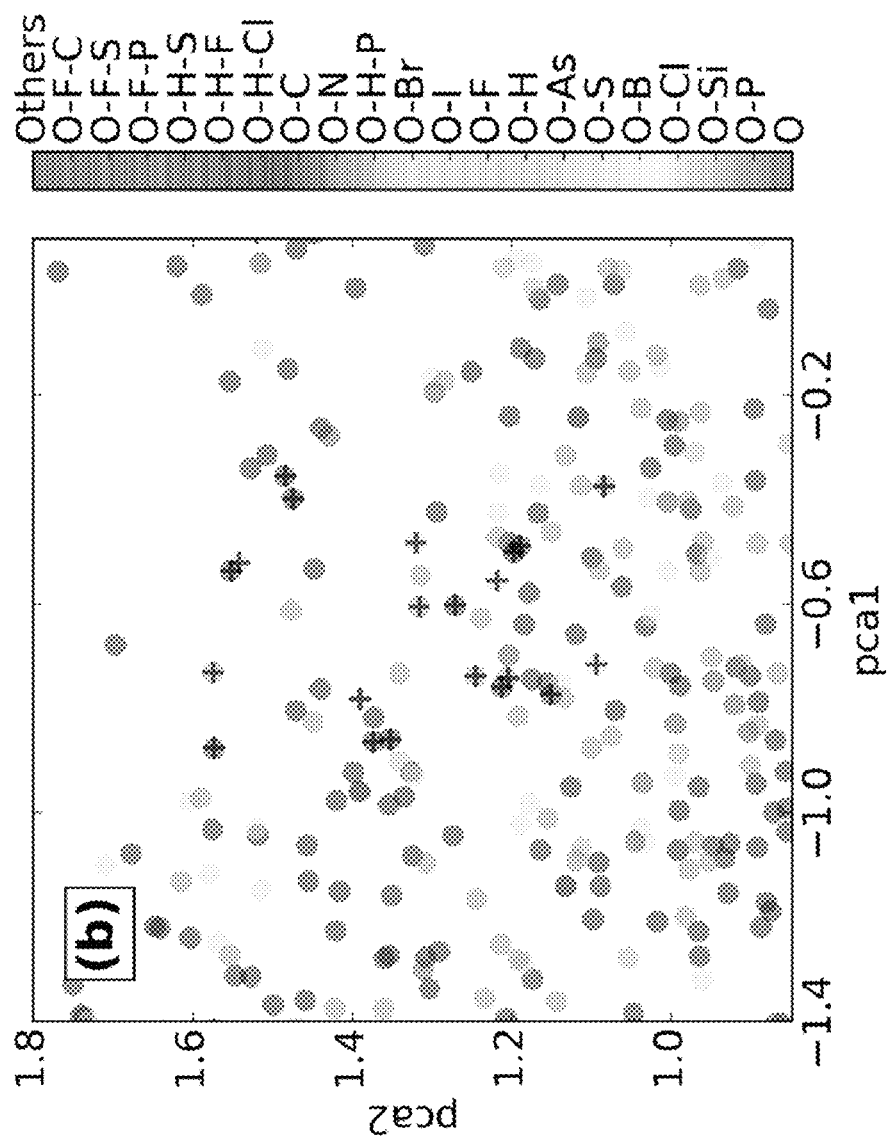
FIG. 5B: Highlighted window magnified.
Figure 5C:
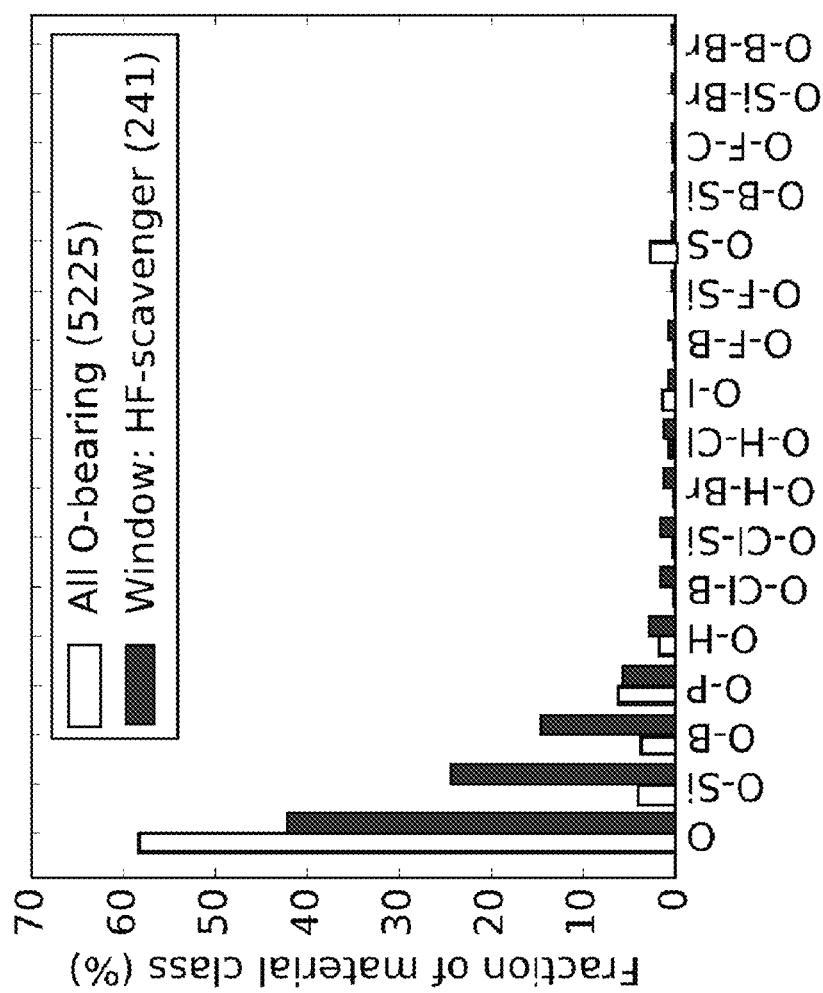
FIG. 5C: The distribution of material classes among all stable O-bearing compounds is compared to that of all HF-scavengers from FIG. 5B. O-bearing compounds were exclusively classified on the basis of the (poly)-anion forming elements they had in addition to oxygen; namely, P, Si, Cl, B, S, As, H, F, I, Br, N and C. For example, compounds labeled as O do not include those labeled as O—P, and similarly O—H—P or O—F—P are not subsets of the O—P category.

The variation of weighted-sum F(x) within the top-30 HF-scavengers list in FIGS. 4C and 4F was relatively slow, which resulted in many similarly good candidates not appearing in the list. But from a practical point of view, rather than extending the list and suggesting more candidates, a broader analysis was carried out to find out which material classes are useful as HF-scavengers. For instance, are plain oxides the best HF-scavengers? To do this analysis, the dimensionality of the 4-D HF-scavenger design space of $E_c$, $E_d$, $E_d$(products), $G_{s-HF}$ was reduced to a 2-D space via principal component analysis (PCA). (See, Jolliffe, I. Principal Component Analysis; Wiley StatsRef: Statistics Reference Online, 2002.) The resulting two highest variance principal components, pca1 and pca2, are shown in FIG. 5A. These components respectively explained 78% and 16% (or in total 94%) of the overall variance of the entire 4-D data set. There were no clearly separated clusters of different material classes in FIG. 5A. However, except for a few outliers, useful compounds identified with weighted-sum were clustered around the same region as shown in detail in FIG. 5B. Materials in proximity to these weighted-sum predicted HF-scavengers also can be good cathode coatings. The distribution of material classes among the 241 candidates in this window was analyzed and compared to the overall distribution of 5225 stable O-bearing compounds in FIG. 5C. While plain oxides, i.e., O-bearing compounds with no other polyanion forming elements, had the largest fraction among the stable compounds, their fraction was smaller among the useful HF-scavengers list. On the other hand, compared to plain oxides or other oxygen polyanion material classes, the fraction of silicates and borates in the promising HF-scavengers window is 5-10 times larger than their fraction among all stable O-bearing compounds.

Deterministic Material Selection for HF-Scavenger Coatings: Cathode in the Chemical Space The trade-offs between conflicting objectives in MOOP of designing cathode coatings do not allow selection of a single "ultimate" coating, and therefore lists of useful candidates are provided in FIGS. 4A-4F. If the relative importance of attributes ($w_i$ in F(x)) were known precisely, one can solve the multi-objective cathode coating design problem within the model exactly. While such high-level information is not available, the goal in designing HF-scavenger coatings is to protect the cathode from acid-attack, while remaining electrochemically inactive. These requirements can actually be tested with chemical reactions defined in Eqs. 1-3 if the coating ($A_aB_bC_c$, ...)$O_x$ in the reactants is replaced with the actual cathode active material+cathode coating mixture. Therefore, the first step in this deterministic analysis was to find what this phase mixture would be for any cathode active material+cathode coating pair, which can be expressed in the form of a reaction as:

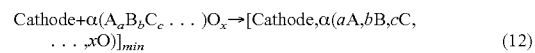
(12)

Here α denotes a dilute amount, analogous to the definition of δ in Eqs. 1-3, and products were again found as the lowest energy combination of the phases at the given composition in the OQMD chemical space. As an example, below is shown the reaction predicted to take place between the common $LiCoO_2$ cathode and an $Al_2O_3$ coating:

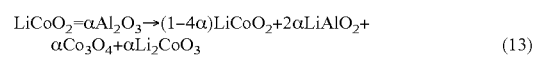
(13)

This reaction shows that $Al_2O_3$ will react with $LiCoO_2$, reduce the amount of this active cathode, and lead to precipitation of $LiAlO_2$ and other Co-oxides. When Al was added to $LiCoO_2$ in experiments, a layered $LiAlO_2$—$LiCoO_2$ solid solution was found to form. (See, Jang, Y.-I.; Huang, B.; Wang, H.; Sadoway, D. R.; Ceder, G.; Chiang, Y.-M.; Liu, H.; Tamura, H. J. Electrochem. Soc. 1999, 146, 862, 868.) Detailed investigations of $Al_2O_3$-coated $LiCoO_2$ and similar layered cathodes also revealed similar solid-solutions near the cathode surface. (Jung, Y. S.; Cavanagh, A. S.; Dillon, A. C.; Groner, M. D.; George, S. M.; Lee, S.-H., Journal of The Electrochemical Society 2010, 157, A75; Yano, A.; Aoyama, S.; Shikano, M.; Sakaebe, H.; Tatsumi, K.; Ogumi, Z. Journal of the Electrochemical Society 2015, 162, A3137-A3144.) Therefore, as the end-member of this solid-solution, prediction of the stability of $LiAlO_2$ with $LiCoO_2$ as in Eq. 13 is consistent with these experiments within the limits of these bulk thermodynamic models based on the OQMD phases.

The products of Eq. 12; i.e., [Cathode; α(aA, bB, cC, ..., xO)]$_{min}$ can be substituted for $(A_aB_bC_c ...)O_x$ on the reactants side of reactions in Eq. 1-3 to keep account of the amounts of cathode and coating materials that go through the reactions. For example, the HF-attack reaction for the equilibrium mixture of $LiCoO_2$ cathode-α$Al_2O_3$ coating described above was found to be:

$$(1-4α)LiCoO_2+2αLiAlO_2+αCo_3O_4+αLi_2CoO_3+ δHF→(1-4α-2δLiCoO_2+2αLiAlO2+α+ δ2Li2CoO3+α+δ2Co3O4+δ2H2O+δLiF \quad (14)$$

This reaction demonstrates that under HF-attack, $LiCoO_2$ is consumed while the amount of $LiAlO_2$ remains the same, indicating the nominal $Al_2O_3$ coating, when allowed to fully react with $LiCoO_2$ to form the equilibrium phase mixture in Eq. 13, will not provide a HF-scavenging protection for $LiCoO_2$. This result is counter-intuitive, as pristine $Al_2O_3$ is a strong HF-scavenger. (See, Chen, Z.; Qin, Y.; Amine, K.; Sun, Y.-K. Journal of Materials Chemistry 2010, 20, 7606; Aykol, M.; Kirklin, S.; Wolverton, C. Advanced Energy Materials 2014, 4, 1400690.)

Here the two most common cathodes that represent the layered and spinel families; i.e., $LiCoO_2$ and Li $Mn_2O_4$, were selected and optimized HF-scavenger coating materials were searched for among the ~5,200 thermodynamically stable candidates using the approach outlined here. To summarize, the equilibrium cathode active material+cathode coating material phase mixture [Cathode; α(aA, bB, cC, ..., xO)]$_{min}$ for $(A_aB_bC_c ...)O_x$ was substituted in Eq. 1-3, then the reaction products and energies were found, and the following criteria were evaluated as pass/fail filters: (i) coating and cathode were stable together (they did react to form other phases), (ii) cathode was protected (not consumed) in HF-attack reaction in Eq. 3, and (iii) coating did not participate in the electrochemical activity upon charge and discharge in reactions Eqs. 1 and 2. Since the amount of cathode and coating materials in reactions could be tracked, these pass/fail filters eliminated the need for most of the screens required in MOOP, and only the HHI, radioactivity and excessive-reactivity screens, as described above, were applied.

While this framework revealed optimal coatings for a given cathode without MOOP, it does not allow ranking the candidates as in MOOP, so "nearly optimal" coatings are also included as useful cathode coatings in view of inherent uncertainties in the calculated free energies. For example, in the charge reaction, a dilute concentration in the electrolyte for the dissolving ion in Eq. 2 was assumed, and the standard oxidation potentials from aqueous solutions were used, both of which are approximations to actual battery systems. Therefore, the uncertainty in calculated $E_c$ values was expected to be larger than that in other calculated thermodynamic quantities. For this reason, the $E_c$ filter was relaxed by an amount equivalent to 2 orders of magnitude deviation in ion activity in the electrolyte, which corresponds to an approximately ±0:12 V window in the potential of a one-electron reaction. (Approximated using the 0:0592 z log(K) term in the Nernst equation at 25° C.) This value was used as a buffer in $E_c$ to find the nearly optimal cathode coating materials. In other words, reactions with $E_c$ values up to 0.12 V higher than that of the cathode material were still allowed to pass the electrochemical stability filter.

The matrix plots of cathode active material+coating coating systems were not similar to FIG. 3 because the chemical reaction spaces were now systematically bounded by reactions pertaining to the cathode material itself. For this reason, in contrast to MOOP in FIG. 3, the ideal points in the plots (i.e., lower left corners), were now well-defined in every panel of matrix plots. It was found that $E_d$ (products) was an attribute that conflicted with $E_c$, and there was no material that would satisfy both criteria as a coating on $LiCoO_2$ or $LiMn_2O_4$. Since $E_d$ and $E_c$ are essential to define the electrochemical stability of the coating material, and the amount of HF-scavenging reaction products will presumably be much less than the coating material, the lithiation of these reaction products (i.e., $E_d$(products)) was excluded from this particular analysis.

TABLE 2

Optimal and nearly-optimal coatings for $LiCoO_2$ and $LiMn_2O_4$. Nearly-optimal coatings correspond to the relaxed $E_c$ filter as explained in the text

| Cathode | Optimal coatings | Nearly optimal coatings |
|---|---|---|
| $LiCoO_2$ | $Li_2SrSiO_4$, $Li_2CaSiO_4$, $CaIn_2O_4$, $SrHClO$, $SrBrOH$, $SrHfO_3$ | $Li_5ReO_6$, $Sr_2MgWO_6$, $Li_4H_3BrO_3$, $Li_4H_3ClO_3$, $Sr_2LiReO_6$, $Sr_2CaWO_6$, $SrZrO_3$ |
| $LiMn_2O_4$ | $Li_2GeO_3$, $Sr_2Nb_2O_7$, $Pb_3Cl_2O_2$, $Pb_3Br_2O_2$, $Li_2TiGeO_5$, $Li_2TiSiO_5$, $Li_4NiTeO_6$, $Ca_2Mn_3O_8$, $Li_2MnO_3$, $Pb_2SO_2$, $PbHClO$, $PbBrOH$, $Ba_2Hg_3Pd_7O_{14}$ | $CaTa_2O_6$, $Pb_3O_4$, $SrBrOH$, $Ba_2TiSi_2O_8$, $Ba_2Ti_4Fe_2O_{14}$, $Sr_2TaFeO_6$, $SrPd_3O_4$, $SrHClO$, $Sr_2NbFeO_6$, $CaPd_3O_4$ |

The results of this design approach where the cathode is in the chemical space along with the coating are shown in Table 2. Out of 5225 thermodynamically stable oxide and oxyanion compound candidates, 1792 are stable (had a tie-line) with $LiCoO_2$ and 1237 candidates can protect $LiCoO_2$ from HF-attack. Of these, 405 compounds provide both cathode+coating stability and protection from HF, while only a few are electrochemically stable (i.e., inactive) as listed in Table 2. For $LiMn_2O_4$, number of compounds stable with it was 1003, and number of those that protect the cathode from HF-attack was 2841. Surprisingly, number of compounds that satisfy both of these filters was only 81, among which only the ones listed in Table 2 are electrochemically stable.

Almost all optimal coatings contained at least one of the s-block elements Li, Sr, Mg, Ca and Ba. These elements form oxygen-bearing compounds that vigorously react with HF, and have only one stable oxidation state so their compounds were often electrochemically stable. The reaction free energy of $LiCoO_2$ with HF was more negative than that of about 70% of candidate coatings considered, whereas for $LiMn_2O_4$ the same number was about 50%. Therefore only materials that very strongly react with HF such as the s-block containing metal oxides/oxyanion compounds were capable of protecting $LiCoO_2$, while compounds bearing p- and d-block elements along with s-block were present among optimal coatings for $LiMn_2O_4$, as listed in Table 2.

Other Factors in Cathode Coating Design

Useful coatings identified with MOOP in FIGS. 4A-4F and those optimized for specific cathodes in Table 2 are not necessarily similar materials. This difference in calculated coatings, and the difference in the design approaches they were predicted with, can be interpreted on the basis of the actual cathode-coating morphology. For a system where the coating is thick enough such that the bulk of the coating away from the cathode-coating interface preserves the targeted nominal coating composition, a model where the cathode active material is not considered in the chemical space maybe more applicable; therefore, the coatings listed in FIGS. 4A-4F are geared more towards such morphologies. For a system where the coating is thin and/or the coating process allows the reaction of the coating material with the cathode, a model where the cathode active material is present in the chemical space, and therefore the predictions in Table 2 are more suitable.

Thermodynamic properties of coatings as included in this framework are necessary but not sufficient to find optimal coatings. There are other thermodynamic and kinetic factors that may influence the effectiveness of a given coating, but cannot be evaluated in a HT fashion.

CONCLUSION

A new high-throughput thermochemical framework to design cathode coating materials for Li-ion batteries has been developed. The framework includes model reactions to describe the thermodynamic stabilities, electrochemical stabilities (both at charge and discharge), and HF-reactivities of candidate oxides and oxyanion compounds. Thermodynamic stability was evaluated by finding whether a compound decomposed into other phases available in the OQMD. Electrochemical stability was evaluated based on the reactivity of the coating with $Li^+$ during discharge, and dissolution of the coating components into electrolyte during charge of the battery. To calculate the free energies of these reactions at room temperature, DFT energies of materials from the OQMD were used in conjunction with experimental thermochemical/electrochemical data including entropy contributions to gaseous reference states, and standard reduction potentials of elements, and the Nernst relation. Reaction products were found in a fully-automated fashion as the lowest energy combination of phases in the OQMD at the composition of the reactants.

The framework was applied to screen more than ~130,000 oxygen-bearing materials available in the OQMD and predicted coatings with various functionalities: physical-barrier, HF-barrier and HF-scavenger. To select the best candidates for each coating category, weighted-sum and rank aggregation multi-objective optimization methods were used. The most useful physical and HF-barrier coatings were found to include metal oxides and phosphates such as $WO_3$, $LiAl_5O_8$, $ZrP_2O_7$, $Hf_2P_2O_9$, $TaPO_5$, $CaSn_4(PO_4)_6$, and the mose useful HF-scavenger coatings included compounds such as $Li_2CaGeO_4$, $LiAl_5O_8$, $TaBO_4$, $LiBO_2$, $Mg_3(BO_3)_2$, $Ca_5(BO_3)_3F$, $Ca_2Ta_2O_7$, and $Li_2MgSiO_4$, to name several examples, with the aid of principal component analysis, the 4-D design space of HF-scavenger coatings was mapped onto two principle components with minimal loss of variance information, and silicates and borates were identified as the two material classes that provide a higher probability to yield effective HF-scavengers compared to all other oxygen-bearing material classes. In addition to multi-objective optimization, a deterministic materials design approach was developed to find cathode-specific coatings by including the cathode active material in the chemical space, evaluating the stability of the cathode-coating pair, and allowing the cathode active material to participate in the chemical reactions of the framework along with the coating material itself. The optimal coatings for a given cathode were then found by determining if the cathode remained intact when the coating was applied or when attacked by HF, and if the coating interfered with the electrochemical activity of the cathode. With this novel design strategy, optimal coatings, such as $Li_2SrSiO_4$, $Li_2CaSiO_4$ and $CaIn2O_4$ coatings for $LiCoO_2$ and $Li_2GeO_3$, $Li_2TiSiO_5$, $Li_4NiTeO_6$, $Ca_2Mn_3O_8$, and $Li_2MnO_3$ for $LiMn_2O_4$ were identified.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A coated cathode comprising:
    an active cathode material for a lithium ion battery; and
    a coating on at least a portion of the active cathode material, wherein the coating comprises a borate selected from $TaBO_4$, $NbBO_4$, $Ca_5(BO_3)_3F$, $Mg_3(BO_3)_2$, and $CaAlBO_4$.

2. A lithium ion battery comprising:
    an anode;
    the coated cathode of claim 1 in electrical communication with the anode;
    an electrolyte disposed between the anode and the coated cathode; and
    a separator disposed between the anode and the cathode.

3. The coated cathode of claim 1, wherein the coating comprises $TaBO_4$.

4. The coated cathode of claim 1, wherein the coating comprises $NbBO_4$.

5. The coated cathode of claim 1, wherein the coating comprises $Ca_5(BO_3)_3F$.

6. The coated cathode of claim 1, wherein the coating comprises $Mg_3(BO_3)_2$.

7. The coated cathode of claim 1, wherein the coating comprises $CaAlBO_4$.

8. A coated cathode comprising:
    an active cathode material for a lithium ion battery; and
    a coating on at least a portion of the active cathode material, wherein the coating comprises a phosphate selected from $Mn_2PO_4F$ and $CaSn_4(PO_4)_6$.

9. A lithium ion battery comprising:
an anode;
the coated cathode of claim 8 in electrical communication with the anode;
an electrolyte disposed between the anode and the coated cathode; and
a separator disposed between the anode and the cathode.

10. The coated cathode of claim 8, wherein the coating comprises $Mn_2PO_4F$.

11. The coated cathode of claim 8, wherein the coating comprises $CaSn_4(PO_4)_6$.

12. A coated cathode comprising:
an active cathode material for a lithium ion battery; and
a coating on at least a portion of the active cathode material, wherein the coating comprises a silicate selected from $Li_2MgSiO_4$, $CaMgSiO_4$, and $CaMgSi_2O_6$.

13. A lithium ion battery comprising:
an anode;
the coated cathode of claim 12 in electrical communication with the anode;
an electrolyte disposed between the anode and the coated cathode; and
a separator disposed between the anode and the cathode.

14. The coated cathode of claim 12, wherein the coating comprises $Li_2MgSiO_4$.

15. The coated cathode of claim 12, wherein the coating comprises $CaMgSiO_4$.

16. The coated cathode of claim 12, wherein the coating comprises $CaMgSi_2O_6$.

17. A coated cathode comprising:
an active cathode material for a lithium ion battery; and
a coating on at least a portion of the active cathode material, wherein the coating comprises a metal oxide selected from $LiAl_5O_8$ and $BaSO_4$.

18. A lithium ion battery comprising:
an anode;
the coated cathode of claim 17 in electrical communication with the anode;
an electrolyte disposed between the anode and the coated cathode; and
a separator disposed between the anode and the cathode.

19. The coated cathode of claim 17, wherein the coating comprises $LiAl_5O_8$.

20. The coated cathode of claim 17, wherein the coating comprises $BaSO_4$.

21. A coated cathode comprising:
a cathode comprising $LiCoO_2$; and
a coating on at least a portion of the active cathode material, wherein the coating comprises a metal oxide selected from $Li_2CaSiO_4$, $Li_4H_3BrO_3$, and $Li_4H_3ClO_3$.

22. A lithium ion battery comprising:
an anode;
the coated cathode of claim 21 in electrical communication with the anode;
an electrolyte disposed between the anode and the coated cathode; and
a separator disposed between the anode and the cathode.

23. The coated cathode of claim 21, wherein the coating comprises $Li_2CaSiO_4$.

24. The coated cathode of claim 21, wherein the coating comprises $Li_4H_3BrO_3$.

25. The coated cathode of claim 21, wherein the coating comprises $Li_4H_3ClO_3$.

26. A coated cathode comprising:
a cathode comprising $LiMn_2O_4$; and
a coating on at least a portion of the active cathode material, wherein the coating comprises a metal oxide selected from $Li_2TiSiO_5$, $Ca_2Mn_3O_8$, $Ba_2TiSi_2O_8$, and $Ba_2Ti_4Fe_2O_{14}$.

27. A lithium ion battery comprising:
an anode;
the coated cathode of claim 26 in electrical communication with the anode;
an electrolyte disposed between the anode and the coated cathode; and
a separator disposed between the anode and the cathode.

28. The coated cathode of claim 26, wherein the coating comprises $Li_2TiSiO_5$.

29. The coated cathode of claim 26, wherein the coating comprises $Ca_2Mn_3O_8$.

30. The coated cathode of claim 26, wherein the coating comprises $Ba_2TiSi_2O_8$.

31. The coated cathode of claim 26, wherein the coating comprises $Ba_2Ti_4Fe_2O_{14}$.

* * * * *